(12) United States Patent
Cooke

(10) Patent No.: US 8,794,426 B2
(45) Date of Patent: Aug. 5, 2014

(54) PALLET-BASED POSITION ADJUSTMENT SYSTEM AND METHOD

(75) Inventor: Gary Cooke, Dundas (CA)

(73) Assignee: ATS Automation Tooling Systems Inc., Cambridge, Ontario (CA)

( * ) Notice: Subject to any disclaimer, the term of this patent is extended or adjusted under 35 U.S.C. 154(b) by 149 days.

(21) Appl. No.: 13/433,375

(22) Filed: Mar. 29, 2012

(65) Prior Publication Data
US 2012/0247925 A1 Oct. 4, 2012

Related U.S. Application Data

(60) Provisional application No. 61/470,411, filed on Mar. 31, 2011.

(51) Int. Cl.
*B65G 47/00* (2006.01)
*B65G 23/23* (2006.01)

(52) U.S. Cl.
CPC ..................................... *B65G 23/23* (2013.01)
USPC .......................................... 198/617; 198/619

(58) Field of Classification Search
USPC ............................ 198/619, 805, 465.1, 465.2
See application file for complete search history.

(56) References Cited

U.S. PATENT DOCUMENTS

| | | | |
|---|---|---|---|
| 3,785,475 | A | 1/1974 | Maynard |
| 4,669,598 | A | 6/1987 | Eitzinger et al. |
| 4,690,066 | A | 9/1987 | Morishita et al. |
| 4,894,908 | A | 1/1990 | Haba, Jr. et al. |
| 5,097,935 | A | 3/1992 | Weiss |
| 5,197,915 | A | 3/1993 | Nakamura et al. |
| 5,735,387 | A | 4/1998 | Polaniec et al. |
| 6,191,507 | B1 | 2/2001 | Peltier et al. |
| 6,378,694 | B1 | 4/2002 | Onoyama et al. |
| 6,459,061 | B1 | 10/2002 | Kugle et al. |
| 6,499,701 | B1 | 12/2002 | Thornton et al. |
| 6,758,320 | B1 | 7/2004 | Tegel |
| 6,876,896 | B1 | 4/2005 | Ortiz et al. |

(Continued)

FOREIGN PATENT DOCUMENTS

| | | |
|---|---|---|
| DE | 29816285 U1 | 1/2000 |
| EP | 0294731 A2 | 12/1988 |

(Continued)

OTHER PUBLICATIONS

PCT International Patent Application No. PCT/CA2012/050197, International Search Report dated Jul. 4, 2012.

(Continued)

*Primary Examiner* — Ramya Burgess
*Assistant Examiner* — Lester Rushin
(74) *Attorney, Agent, or Firm* — Borden Ladner Gervais LLP; Neil Henderson

(57) ABSTRACT

A conveyor system that includes a track section including a control system, a drive system that is controlled by the control system and that is configured to provide power through a first electromagnetic field and through an alternating second electromagnetic field, a plurality of moving elements that are driven by the drive system and that are configured to receive power through the first electromagnetic field, where at least one of the plurality of moving elements includes a pick-up unit configured to receive power through the alternating second electromagnetic field, a pallet support apparatus, and a plurality of pallets that are configured to engage with the plurality of moving elements and move on the pallet support apparatus.

17 Claims, 23 Drawing Sheets

(56) References Cited

U.S. PATENT DOCUMENTS

| | | | |
|---|---|---|---|
| 6,997,303 | B2 | 2/2006 | Edwards et al. |
| 7,014,033 | B2 | 3/2006 | Sticht et al. |
| 7,021,450 | B2 | 4/2006 | Jones, Jr. |
| 7,219,785 | B2 | 5/2007 | Saito et al. |
| RE39,747 | E | 7/2007 | Peltier et al. |
| 7,264,111 | B2 | 9/2007 | Veiner |
| 2002/0079254 | A1 | 6/2002 | Soldavini et al. |
| 2003/0230941 | A1 | 12/2003 | Jacobs |
| 2004/0262401 | A1 | 12/2004 | Kilibarda |
| 2005/0061195 | A1* | 3/2005 | Lutz et al. .................... 104/290 |
| 2010/0313031 | A1 | 12/2010 | Jaslet et al. |

FOREIGN PATENT DOCUMENTS

| | | |
|---|---|---|
| EP | 1428613 A1 | 6/2004 |
| EP | 1882545 A | 1/2008 |
| WO | 02072453 A2 | 9/2002 |
| WO | 2008008029 A1 | 1/2008 |
| WO | 20121012906 A1 | 2/2012 |

OTHER PUBLICATIONS

PCT International Searching Authority (CA), International Search Report, Aug. 18, 2010, PCT/CA2010/000302.

PCT International Searching Authority (CA), The Written Opinion of International Searching Authority, Aug. 18, 2010, PCT/CA2010/000302.

PCT International Searching Authority (CA), International Search Report, Jul. 14, 2010, PCT/CA2010/000301.

PCT International Searching Authority (CA), The Written Opinion of International Searching Authority, Jul. 14, 2010, PCT/CA2010/000301.

European Patent Application No. 10748263.0, Extended Search Report dated Feb. 10, 2012.

English Abstract of EP Patent No. EP1428613, Mar. 5, 2012, espacenet.com.

English Abstract of EP Patent No. Ep 0294731, Mar. 5, 2012, espacenet.com.

English Abstract of DE Patent No. 29816285, Mar. 5, 2012, espacenet.com (No abstract available).

U.S. Appl. No. 12/717,005, Office Action dated Jun. 8, 2012.

* cited by examiner

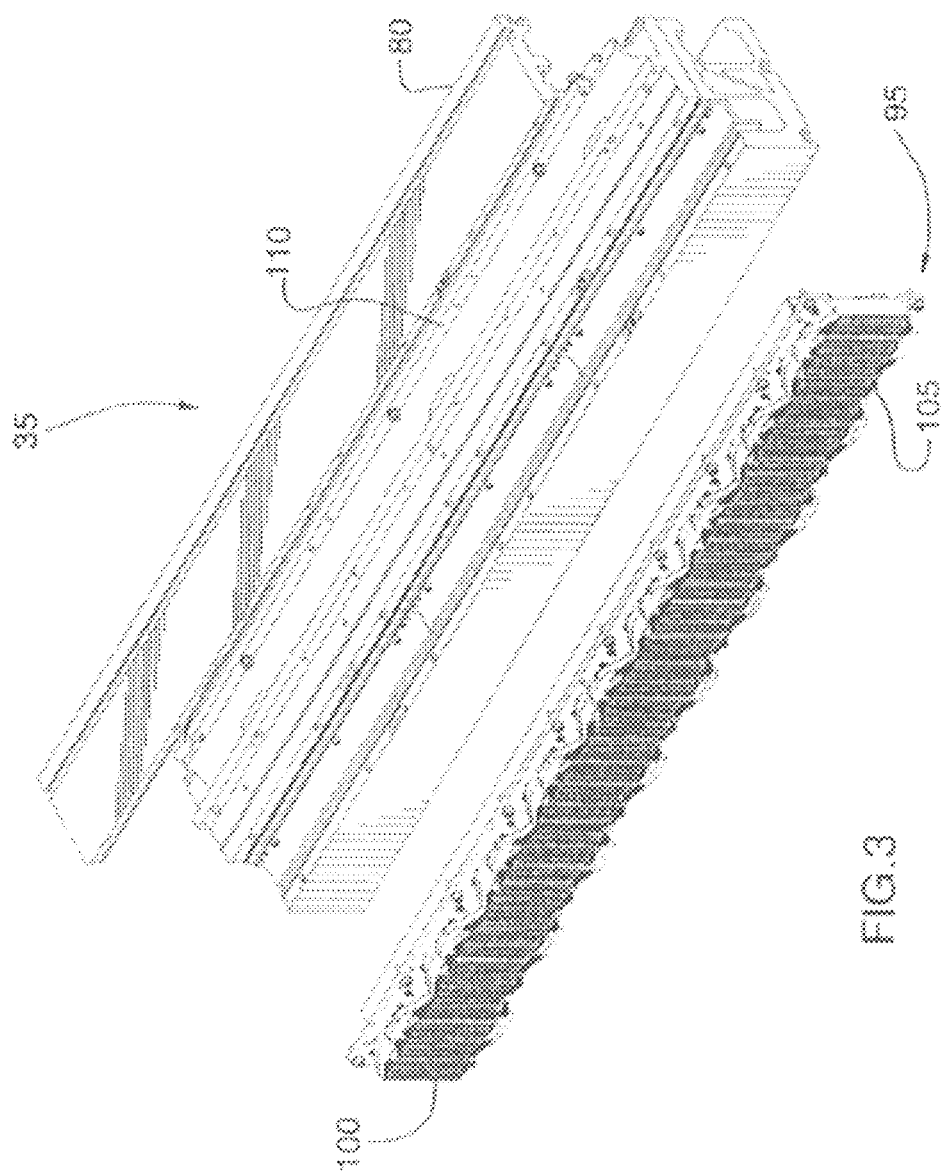

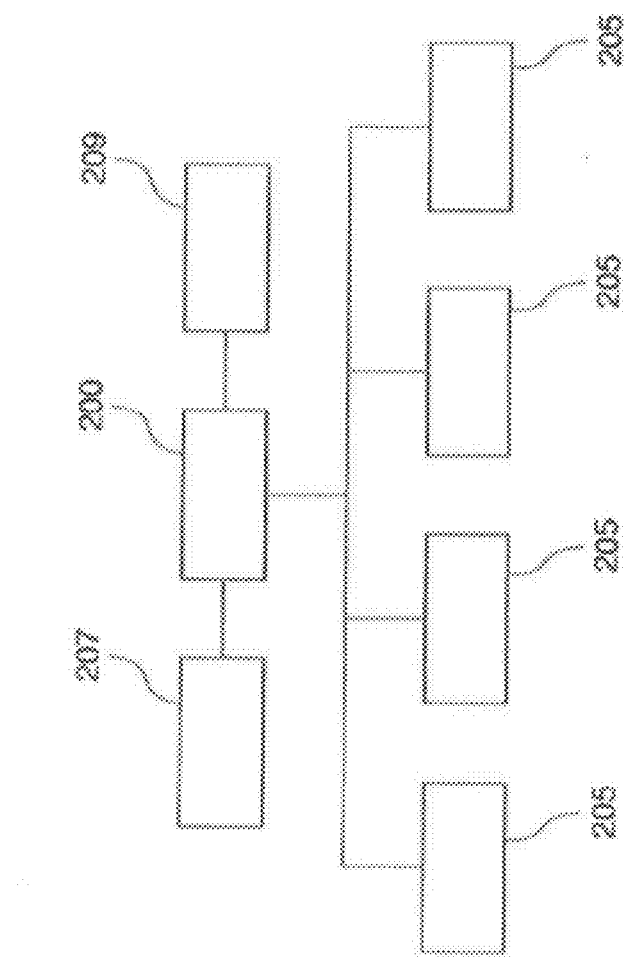

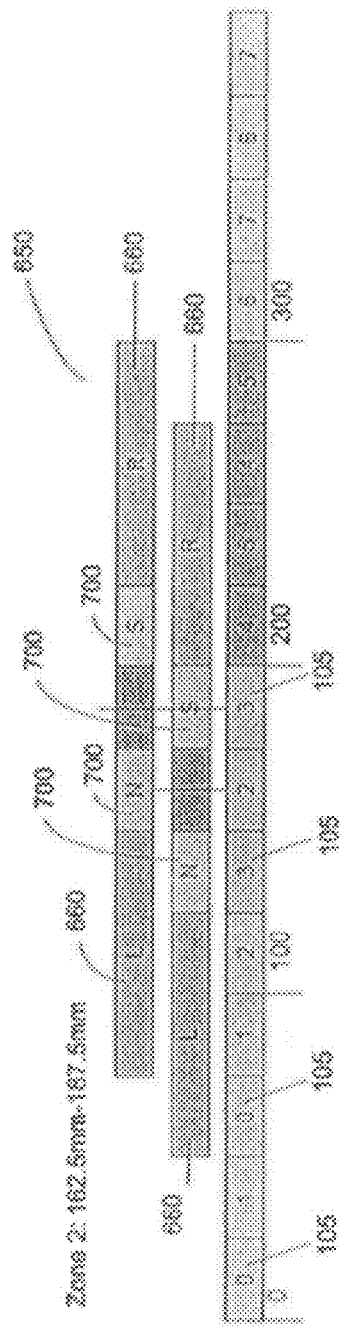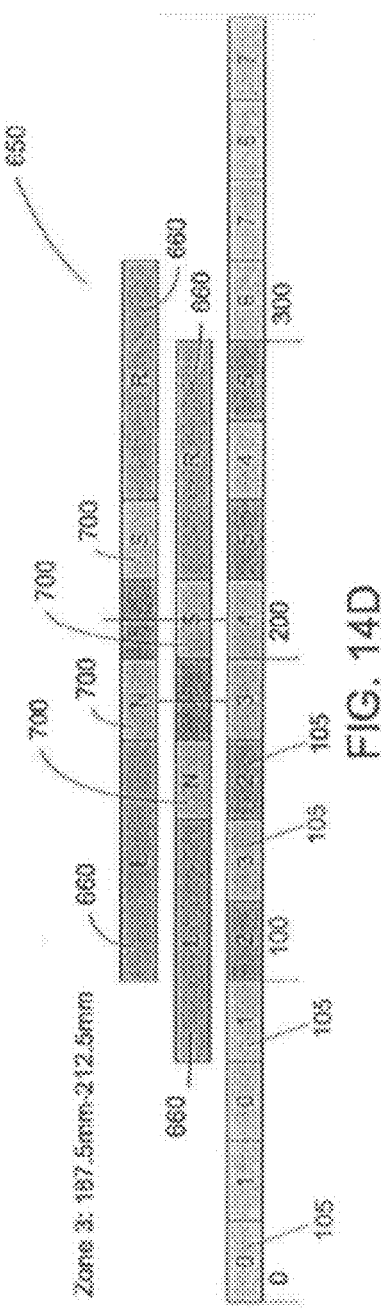
FIG. 14C
FIG. 14D

PALLET-BASED POSITION ADJUSTMENT SYSTEM AND METHOD

CROSS REFERENCE TO RELATED APPLICATIONS

This application claims the benefit of priority of U.S. Provisional Patent Application No. 61/470,418 filed Mar. 31, 2011, which is incorporated herein by reference in its entirety.

FIELD

This application generally relates to transport systems and methods, and more specifically to systems and methods for providing power to moving elements in a transport system.

BACKGROUND

There are a number of fundamental limitations with conventional transport systems such as mechanical conveyor systems that employ a belt for transporting pallets between processing stations. For example, the speed of the belt is typically quite limited, it is generally not possible to vary the position of, or the acceleration and velocity profiles for individual pallets, and it can be difficult to track pallets accurately in the system.

Transport systems including conveyor systems having multiple pallets under substantially independent control are known in the art, but may suffer from a variety of limitations. For example, in some cases involving linear motors, the carts or pallets cannot be positioned to stop at any point along the conveyor, but only where linear motors are disposed. This can make it difficult to change the location of a station or pinpoint the location of a moving pallet at any time. Such systems also tend to have complex pallet tracking systems, limitations on the number of moving elements that can be controlled, or provide jerky movement due to the use of series-connected motor coils, large pitch motors, fixed step controllers or the like.

One issue for transport systems, including belt or scroll driven conveyors as well as linear driven conveyors is the provision of power to the moving element/pallet for use in processing, testing or the like.

Some attempts have been made to provide power on moving elements/pallets for transport systems using inductive power. Most conventional inductive power transfer systems use a high frequency alternate current primary conductor for providing an electromagnetic field extending along the primary conductor and a pick-up unit with a secondary conductor for the inductive energy transfer. The primary conductor is typically located parallel to the motion path so that the space between the primary and secondary conductor remains essentially constant. As such, typical existing inductive power transfer systems:

- radiate an electromagnetic field along the entire motion path irrespective of the location of any pick-up units;
- use a single fixed frequency power supply to energize the primary conductor;
- require intelligent pick-up units to provide on/off control and/or variable power output; and
- unintended coupling on an unexpected receiver could result in power leakage or damage, for example, to unshielded electronic equipment, or personal injury, for example jewelry heated by energy transfer.

Other systems may require onboard energy storage, such as batteries, to compensate for periods when the moving element is not sufficiently coupled to a power source.

Accordingly, there is a need for improved systems and methods for providing power to moving elements of a conveyor system.

SUMMARY

As noted above, in existing inductive power transfer systems power is often supplied to moving elements by using inductive power transfer having one or more source (primary conductor) and pick-up (secondary conductor) elements. This document generally relates to systems and methods for controlling sources to provide power to pick-ups on moving elements by modulating the frequency of the source.

In an aspect herein, there is provided a system or method in which the source is also configured to provide an electromagnetic field used to provide energy to move the moving element as well as providing the alternating electromagnetic field required to transfer power to the pick-up unit. For example, the source may be modulated at one frequency to provide the movement and another frequency to provide power transfer.

In another aspect, there is provided a system or method in which the modulation of the source electromagnetic field is varied in response to the position of the pick-up unit. In this case, the source includes a plurality of independent coils along the path of the moving element. Each coil can be independently driven to produce an electromagnetic field having an independently selected frequency.

In another aspect, there is provided a system or method in which the source of the electromagnetic field used to produce the power transferred to a pick-up unit changes as the pick-up unit (moving element) moves along its desired path.

In another aspect, there is provided a system or method in which the source of the electromagnetic field used to produce the power transferred to a pick-up unit is a portion of a linear motor.

In still another aspect, there is provided a system or method in which the power transferred to a pick-up unit can be controlled (on/off) by controlling the source of the coupled electromagnetic field.

In still yet another aspect, there is provided a system or method in which the amount of power transferred to a pick-up unit can be varied by controlling the source of the coupled electromagnetic field.

In various systems according to the application, the moving element can engage a pallet for transport along the conveyor system. The electrical power, which can be inductively transferred to the pick-up on the moving element, can be used to power motors positioned on the pallet. The motors can be used to adjust the position of a work plate located on the pallet, for example by shifting the work plate (and associated workpiece) perpendicular to the pallet travel path, and/or rotating the work plate (and associated workpiece).

According to an aspect herein, there is provided a conveyor system that includes: a track section comprising a control system; a drive system that is controlled by the control system and that is configured to provide power through a first electromagnetic field and through an alternating second electromagnetic field; a plurality of moving elements that are driven by the drive system and that are configured to receive power through the first electromagnetic field, wherein at least one of the plurality of moving elements comprises a pick-up unit configured to receive power through the alternating second electromagnetic field; a pallet support apparatus; and a plurality of pallets that are configured to engage with the plurality of moving elements and move on the pallet support apparatus.

The first electromagnetic field may be modulated at one frequency to provide power to the moving elements, the alternating second electromagnetic field may be modulated at another frequency to provide power to the pick-up unit, or both. The modulation of the frequency of the first electromagnetic field, the alternating second electromagnetic field, or both, may be varied in response to the position of the pick-up unit.

The conveyor system may include a plurality of independent coils along the drive system, at least one of the independent coils producing an electromagnetic field modulated at a different frequency from the electromagnetic field produced by another independent coil.

The conveyor system may include a plurality of independent coils along the drive system and the conveyor system may be configured to: provide power to the pick-up unit through one of the plurality of independent coils at one location along the drive system, and provide power to the pick-up unit through another of the plurality of independent coils at a different location along the drive system. At least one of the independent coils may produce an electromagnetic field modulated at a different frequency from the electromagnetic field produced by another independent coil.

The drive system may include a linear motor and a portion of the linear motor may be adapted to provide power to the pick-up through the alternating second electromagnetic field.

The conveyor system may be adapted to control the power delivered to the pick-up by controlling the presence, absence, or strength of the alternating second electromagnetic field.

The pick-up unit may provide power to an engaged pallet, and the provided power may be used to power at least one motor positioned on the pallet. The at least one motor may position a work plate on the pallet. The motor may position the work plate by: shifting the work plate perpendicular to a pallet travel path, rotating the work plate, or both.

In another aspect herein, there is provided a method of providing power to a moving element of a conveyor system and to a pick-up unit of the moving element, the method include: providing a first electromagnetic field to provide power to the moving element; and providing an alternating second electromagnetic field to provide power to the pick-up unit; wherein the moving element and pick-up unit are configured to receive power through the respective electromagnetic fields.

The method may include modulating the first electromagnetic field at one frequency to provide power to the moving element, modulating the alternating second electromagnetic field at another frequency to provide power to the pick-up unit, or both. Modulating the frequency of the first electromagnetic field, the alternating second electromagnetic field, or both, may be varied in response to the position of the pick-up unit.

The method may include producing an electromagnetic field modulated at one frequency using one independent coil and producing another electromagnetic field modulated at an another frequency using another independent coil, wherein the two electromagnetic fields are modulated at different frequencies. Power may be provided to the pick-up unit through the one independent coil at one location and power may be provided to the pick-up unit through the other independent coil at another location.

Delivery of power to the pick-up may be controlled by changing the presence, absence, or strength of the alternating second electromagnetic field.

The method may further include providing power from the pick-up unit to at least one motor positioned on a pallet engaged by the moving element, and powering the at least one motor. Powering the at least one motor may include using the motor to position a work plate by shifting the work plate perpendicular to a pallet travel path, rotating the work plate, or both.

BRIEF DESCRIPTION OF THE DRAWINGS

The drawings included herewith are for illustrating various examples of systems and methods for providing power to moving elements in a transport system and are not intended to limit the scope of what is taught in any way. In the drawings:

FIG. 3 is an expanded view of the track section of FIG. 2;

FIGS. 7A and 7B are block diagrams of an example distributed control architecture for controlling the track section of FIG. 2;

FIGS. 14A to 14D show diagrammatic representations of a method of providing power to a moving element;

DETAILED DESCRIPTION

Numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein. The embodiments described herein are not intended to be limited to the specific details of any one example embodiment or to specific details that may be common to multiple, or all, example embodiments. The applicants, inventors or owners reserve all rights that they may have in any embodiments disclosed herein, for example the right to embodiments claimed in a continuing application, and do not intend to abandon, disclaim or dedicate to the public any such embodiments by disclosure of this document.

Figure 1:
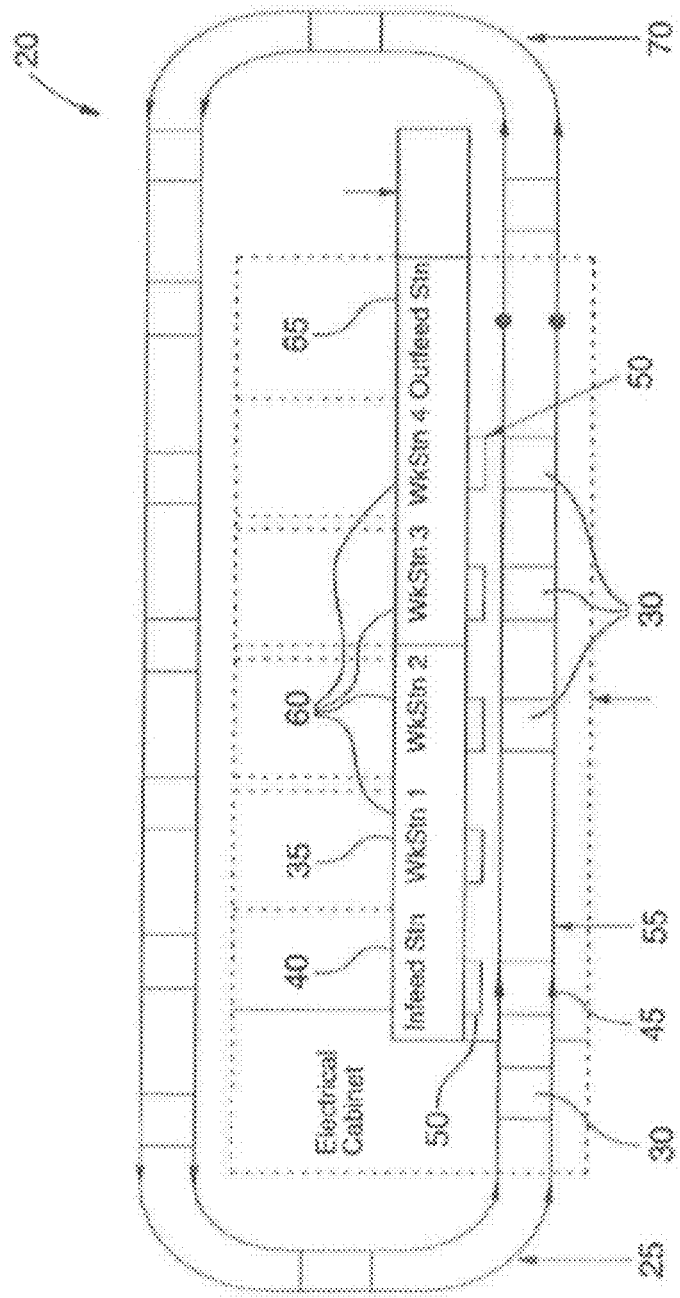
FIG. 1 is a schematic diagram of a transport system, in particular a modular conveyor system.

FIG. 1 shows a general schematic diagram of a modular conveyor system 20, which will be used to provide a general description of the system. It should be understood that other transport systems, such as systems using semi-autonomous vehicles, may also benefit from the embodiments disclosed herein and the system and method for providing power to a moving element may function equally as well with other transport systems.

The system 20 includes an infeed conveyor 25, which delivers pallets 30 to a track section 35. The infeed conveyor 25 may be, for example, a belt conveyor, conveyor known in the art, or the like. As the pallets 30 arrive at an infeed station 40, they are detected and held at the infeed station 40 by a holding mechanism 45, such as a gate, lock or the like. In fact, several pallets 30 may be held at the infeed station 40 depending on the operating status of the system 20. A moving element 50 mounted on the track section 35 engages with the pallet 30 at the infeed station 40 and, after release from the holding mechanism 45, the moving element 50 moves the pallet 30 onto a pallet rail 55 that is positioned adjacent the track section 35 and transports the pallet 30 in an independently controlled manner to a workstation 60. As will be understood, the pallet 30 may include some means (not shown) to reduce friction on the pallet rail 55 to allow the moving element 50 to move the pallet 30. At the workstation 60, the pallet 30 is accurately positioned by the moving element 50 and then held in a place by a locking mechanism (not shown in FIG. 1) provided at the workstation 60. The workstation 60 typically includes an apparatus (not shown) such that an operation, for example a pick and place or other operation, can be performed on a workpiece (not shown), such as a part, device or the like that is being carried by the pallet 30. While the pallet 30 remains at the workstation 60, the moving element 50 can be disengaged from the pallet 30 and is free to move and collect a subsequent pallet 30 while another moving element 50 may return to connect with the pallet 30 at the workstation 60. In this way, the movement of each pallet 30 from workstation 60 to another workstation 60 is carried out by moving a plurality of moving elements 50 along the track section 35, each moving element 50 being independently controlled.

In situations where multiple operations are performed while a particular pallet 30 is at a workstation 60 (multi op), the moving element 50 may remain engaged with the pallet 30 while the pallet 30 is at the workstation 60 and can provide any x-axis movement required for the operations. In this situation, it will be understood that the moving element 50 which moves the pallet 30 to the first workstation 60 could remain engaged with the pallet 30, in which case the moving element 50 would return to collect a new pallet 30 after the operations are completed. Alternatively, a second moving element 50 could engage with the pallet 30 for the various operations. The particular arrangement will depend on the timing of operations at different workstations 60 along the track section 35.

Generally speaking, each pallet 30 may then be moved/indexed independently and accurately through any number of workstations 60 (four shown) and via any number of track sections 35 (two shown).

At the end of all workstations 60, each pallet 30 is moved to an outfeed station 65 where it is moved onto an outfeed conveyor 70 by a moving element 50 and is disengaged. This releases the pallet 30 to be carried by the outfeed conveyor 70 to the next processing operations (not shown). In some embodiments, a sensor (not shown) may be provided at the outfeed station 65 or on the outfeed conveyor 70 to monitor a buffer to the next processing cell in order to slow or stop the conveyor system 20 if the buffer is full or becoming full. As with the infeed conveyor, the outfeed conveyor may also be a conventional conveyor such as a belt conveyor or the like.

This combination of conventional infeed and outfeed conveyors with the independently controlled track sections provides for a lower cost modular conveyor system because it makes use of cheaper, conventional pallets 30 and a limited number of independently-controlled moving elements 50 for each of the track sections 35. The use of cheaper conventional conveyor types also allows flexibility in design of manufacturing lines by allowing operations that do require detailed control to be performed on the track section and operations that do not require as much detailed control to be performed on the conventional conveyor.

The modularity and independent control provided by the track sections 35 also make it easier to retool the modular conveyor system 20 as each workstation 60 can be provided at any point along the track section 35 and can be adjusted quite easily based on the independent control. Further, the modularity allows for a plurality of track sections 35 to be included together to provide as large a processing area as needed for a particular process and the flexibility to adjust the layout as needed.

Figure 2:
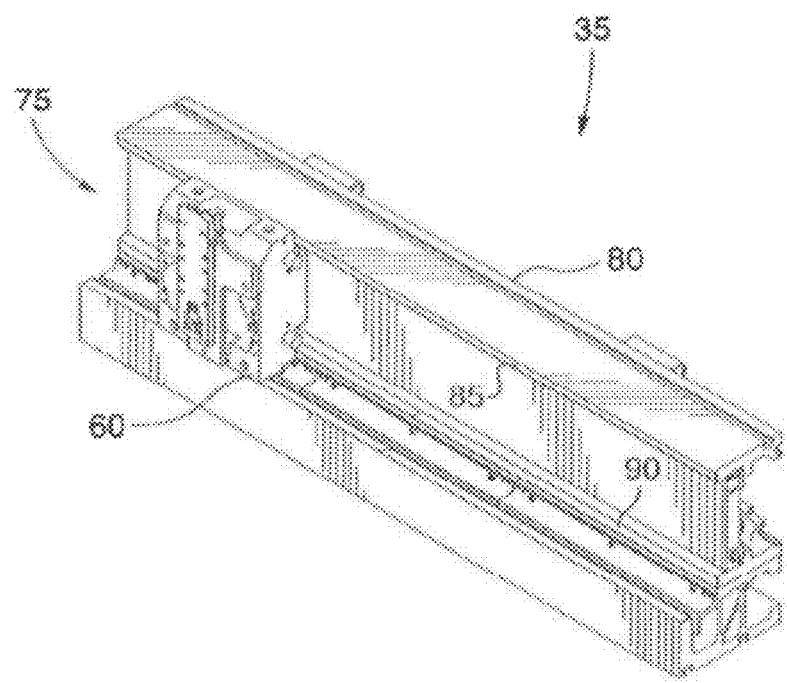
FIG. 2 is a perspective view of a track section of the modular conveyor system of FIG. 1.

FIG. 2 illustrates a track section 35 of the modular conveyor system 20. The track section 35 features one or more moving elements 50 (only one is illustrated) which are configured to ride or travel along a track 75. The track 75 includes a frame 80 configured to support the moving element 50 on an upper runner 85 and lower runner 90. Some of the principles of operation of the track section 35 are described in more detail in U.S. Pat. RE 39,747 to Peltier, which is hereby incorporated herein by reference.

The modular conveyor system 20 can be composed of a plurality of track sections 35, which are mechanically self-contained and quickly and easily separable from one another so as to be modular in nature. In this embodiment, the track sections 35 are mounted on a support (not shown) so as to align and abut one another in order to form a longer track. In order to be modular, each track section 35 preferably houses all of the electronic circuitry required to power and control the track section 35.

FIG. 3 illustrates an expanded view of the track section 35. The frame 80 houses a linear drive mechanism 95 that is formed as a stator armature 100 comprising a plurality of embedded coils 105 which are individually excited so that an electrically-induced magnetic flux produced by the stator armature 100 is located adjacent to a given moving element 50 to be controlled, in a direction normal thereto, without significantly affecting adjacent moving elements 50. The coils 105 are arranged as a sequence of individual polyphase-like windings or coil sets, wherein coils in each set are overlapped such that the coil centres are spaced apart. The frame 80 also includes a bus bar 110 to provide power to the stator armature 100. The motive force for translating each moving element 50 arises from the magnetomotive (MMF) force produced by each moving element 50 and the stator armature 100, i.e., by the tendency of the corresponding magnetic fluxes provided by the stator armature 100 and moving element 50 to align. A servocontrol system (described below) enables separate and independent moving MMFs to be produced along the length of the track section 35 for each moving element 50 so that each moving element 50 can be individually controlled with a trajectory profile that is generally independent of any other moving element 50. Structurally, the track section 35 may thus be broadly classified as a moving-magnet type linear brushless motor having multiple moving elements 50.

Figure 4A:
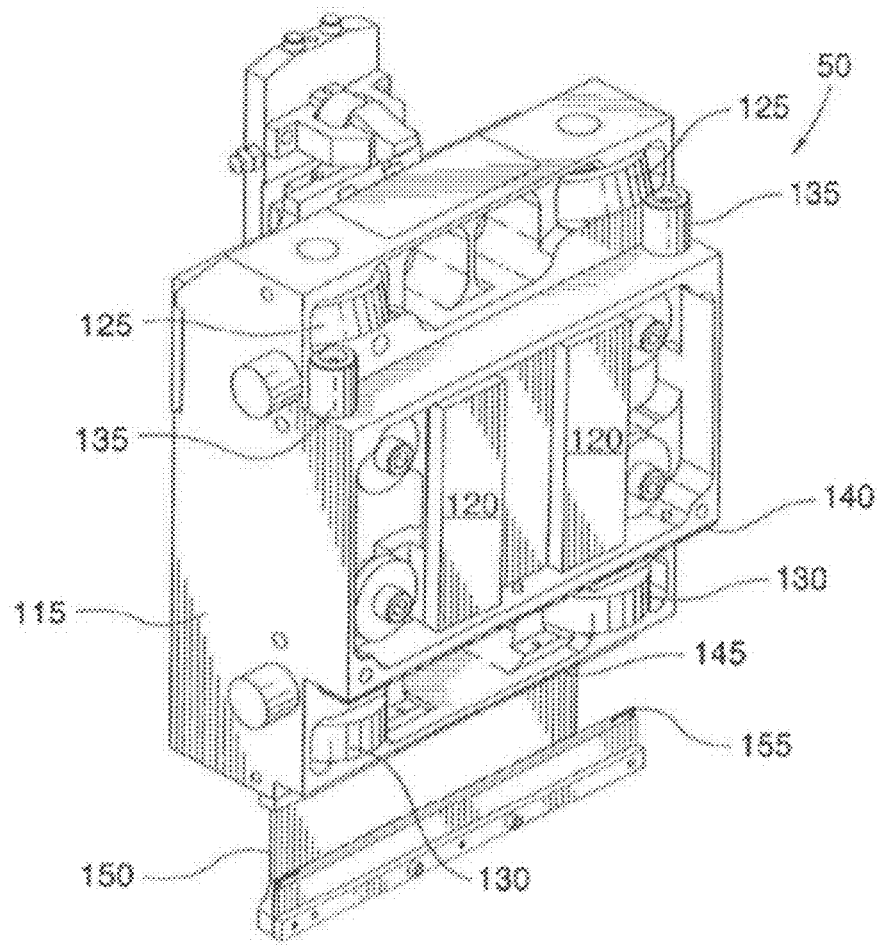
FIGS. 4A and 4B are perspective views of a moving element of the track section of FIG. 2.
Figure 4B:
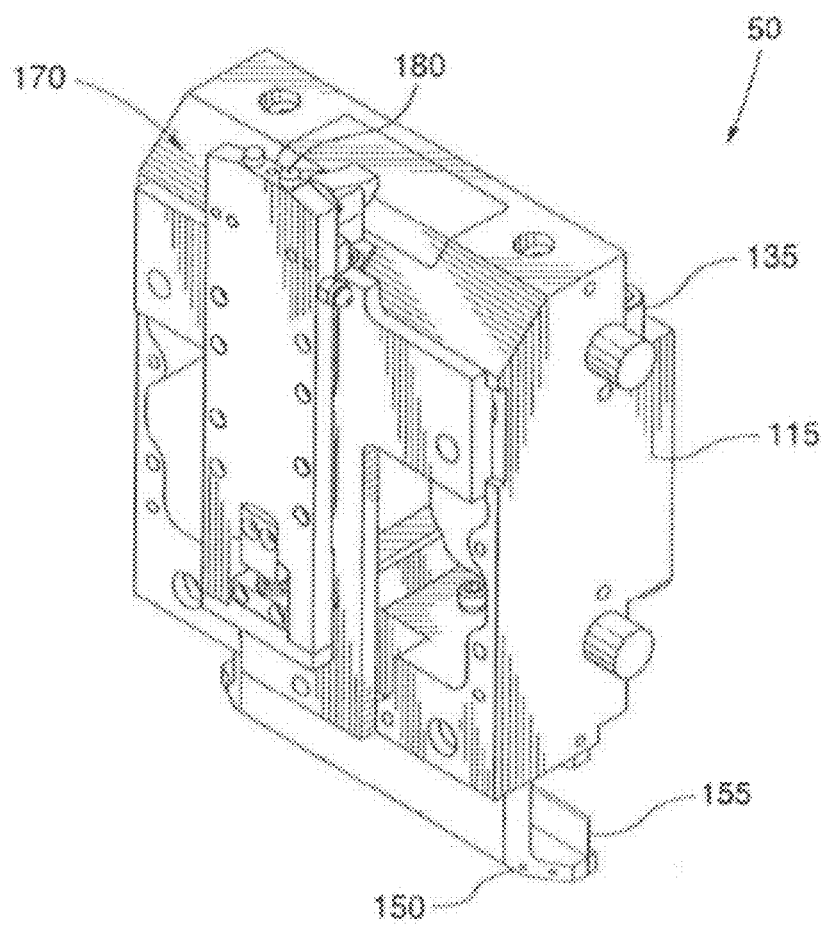
Figure 5:
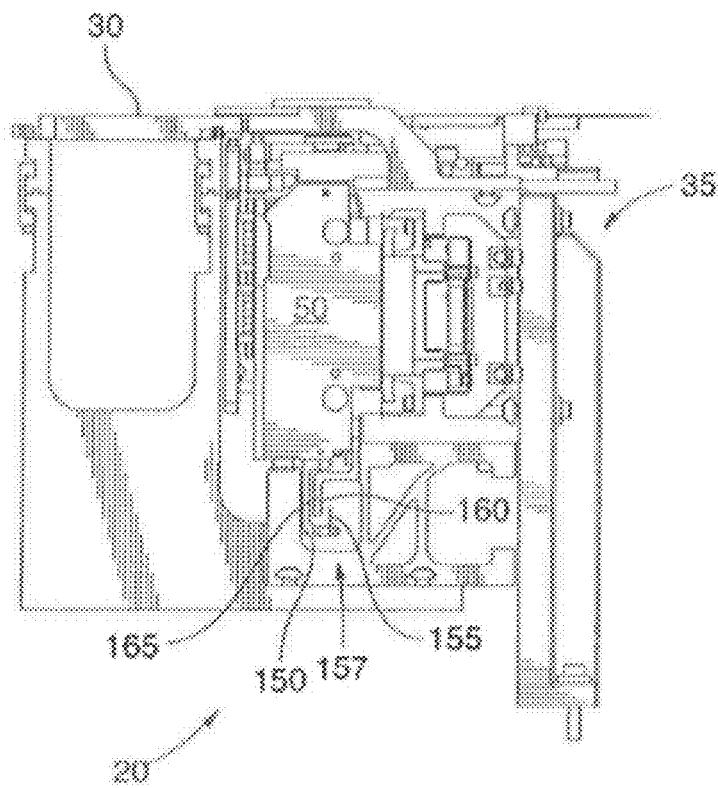
FIG. 5 is a sectional view of the track section, moving element and part pallet.

FIGS. 4A and 4B illustrate perspective views of the moving element 50 and FIG. 5 shows a sectional view of the track section 35, moving element 50 and pallet 30. As shown in FIG. 4A, each moving element 50 includes a body 115 which houses one or more permanent magnets 120 disposed to provide a magnetic flux orientated normal to the track section 35. In the example configuration of FIG. 4A, the magnetic structure of each moving element 50 comprises two thrust-producing permanent magnets 120 arranged in alternating North-South sequence. The permanent magnet material, which may include Neodymium-Iron-Boron, Alnico and ceramic (ferrite) base magnets, is generally selected on the basis of air gap flux densities required and the physical dimensions of the moving element 50 magnetic structure.

As shown in FIGS. 4A, 4B and 5, each moving element 50 features upper wheels 125 and lower wheels 130 which ride along upper and lower runners 85, 90 of track 75. In this particular embodiment, the upper wheels 125 are angled to match with the angled upper runner 80 to provide a downward force on the moving element 50 and help prevent the moving element 50 from separating from the track 75. It will be understood that alternate arrangements may provide the same functionality. The moving element 50 is also provided with anti-tip blocks 135 that can interact with the frame 80 to help prevent the moving elements 50 from tipping if there is a collision or the like. The moving element 50 may also include plastic slider element 140 that reduces friction as the moving element 50 slides along the face of the track 75. The moving element 50 may also include static brushes 145 that assist with dissipating any build up of static electricity.

As further seen in FIGS. 4A and 5, each moving element 50 includes an extension 150 onto which is mounted an encoder strip 155, which may be, for example, an optically transmissive or reflective strip, a magnetic strip, other type of feedback system or the like. The extension 150 is configured such that the encoder strip 155 interacts with encoder read heads 160 mounted to a corresponding extension 165 extending from the track 75 (see FIG. 5). The encoder read heads 160 are configured to read the encoder strip 155, whether optically, magnetically or otherwise. The encoder strip 155 and encoder read heads 160 form an encoder system 157 (see FIG. 5). The inter-engaging structure is intended to protect the encoder system 157 from the traffic on the track 75 and dust and other debris. The encoder system 157 is employed in the moving element position-detecting subsystem explained in greater detail below. At this point, it should be appreciated that by placing the encoder read heads 160 on track 75 and not on moving elements 50, the moving elements 50 are not tethered in any way and thus their mobility is not restricted.

As seen in FIG. 4B, the moving element 50 also includes an engagement mechanism 170 that allows the moving element 50 to engage with the pallets 30 (also referred to as the moving element portion of the pallet engagement mechanism). In this particular embodiment, the engagement mechanism 170 includes a mounting plate 175 (also referred to as a frame) provided with pins 180. The mounting plate 175 is spring-biased such that pins 180 are in an extended position above the moving element 50. The engagement mechanism 170 is described in further detail below with regard to FIGS. 6A and 6B. It will be understood by those of skill in the art that alternate engagement mechanisms may also be contemplated, including non-contact engagement mechanisms such as magnetic engagement mechanisms.

Figure 6A:
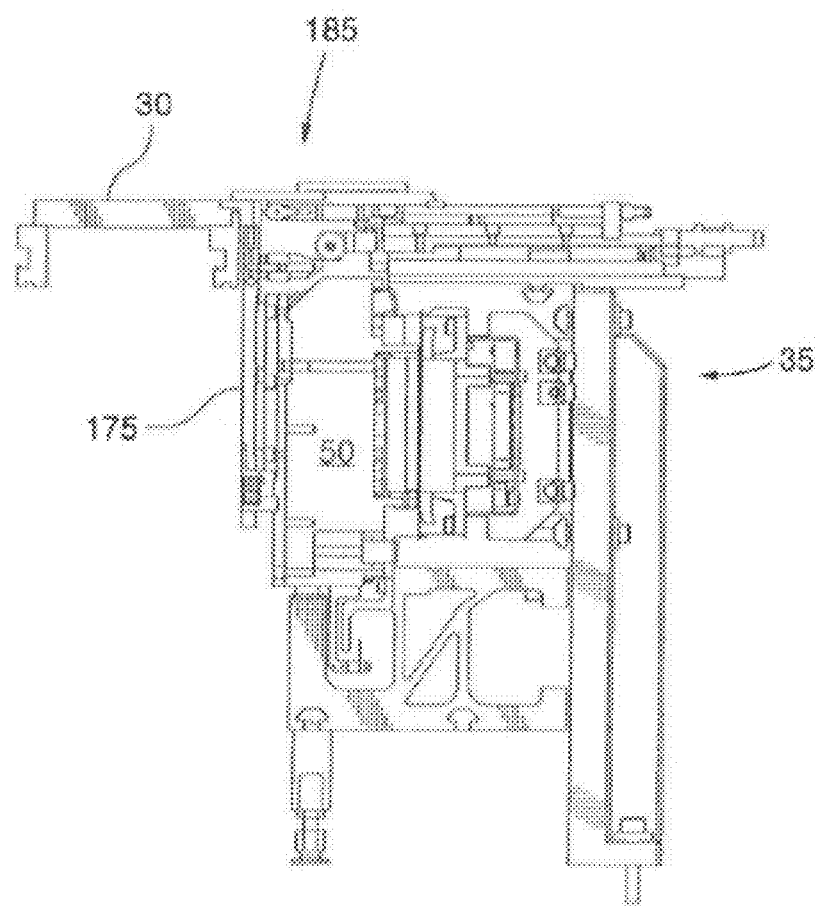
FIGS. 6A and 6B are sectional views of the track section, moving element and pallet showing engagement of the moving element with the pallet.
Figure 6B:
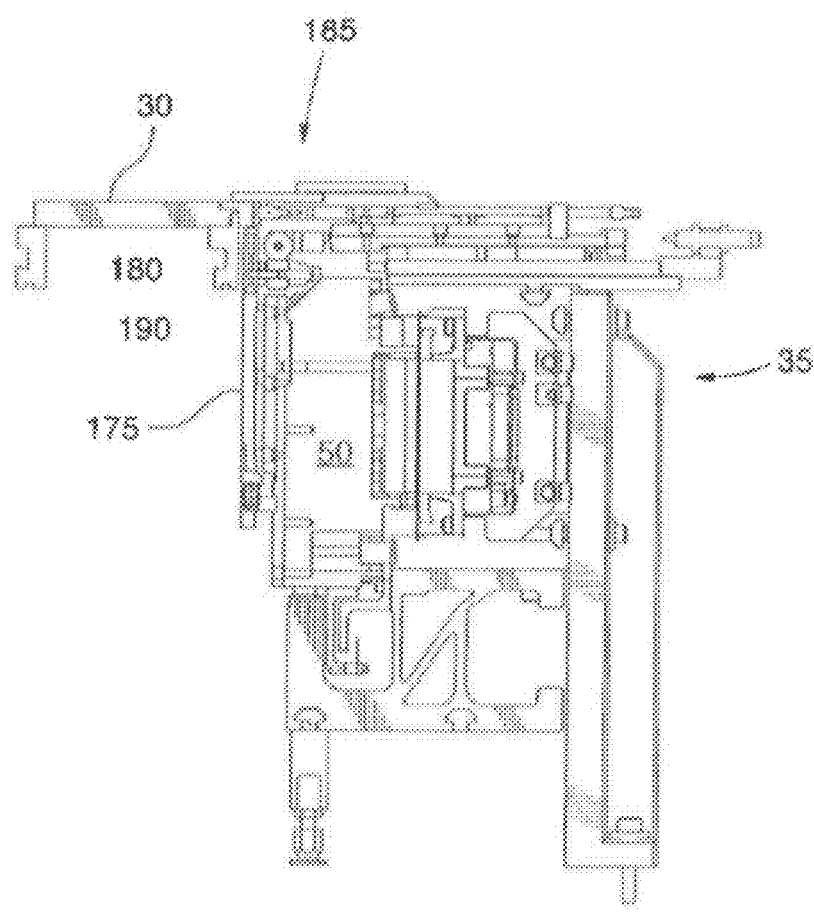

FIGS. 6A and 6B illustrate the disengagement of the moving element 50 and the pallet 30 at the workstation 60. As shown in FIG. 6A, the moving element 50 arrives at a workstation 60 engaged with a pallet 30. As a first stage, a workstation locking mechanism 185 engages with the pallet 30 to hold the pallet 30 in place adjacent the workstation 60. In FIG. 6B, as a second stage, a pallet engagement mechanism 190 provided at the workstation 60 (in this case, a movable cam, sometimes referred to as the workstation portion of the pallet engagement mechanism) is advanced forward to lower the mounting plate 175 and pins 180 from the moving element 50 such that the moving element 50 is disengaged from the pallet 30. The moving element 50 is then free to move along the track section 35 while the pallet 30 remains locked at the workstation 60.

FIG. 7A is a block diagram of an example control architecture employed in the conveyor system 20. As shown in FIG. 7A, the conveyor system 20 includes a central controller 200 that controls the overall conveyor system 20 and a section controller 205 for each of the track sections 35 used in the conveyor system 20 (four section controllers 205 are shown). As described above, the conveyor system 20 can be formed from a plurality of modular track sections 35, representing control zones, which are controlled by a section controller 205. The central controller 200 may monitor destination data for the moving elements 50 (which are preferably uniquely addressed) and receive acknowledgement messages in return when moving elements 50 have reached their destinations. As such, the central controller 200 may be used for process (i.e. manufacturing-line) control. The central controller 200 may also provide a supervisory diagnostic role by monitoring the section controllers 205 (e.g., by engaging in a continuous polling process) in order to determine whether any section controller 205 has failed. It will also be understood that the central controller 200 may also provide control for the infeed conveyor 25 and outfeed conveyor 70, for example via infeed controller 207 and outfeed controller 209.

Figure 7B:
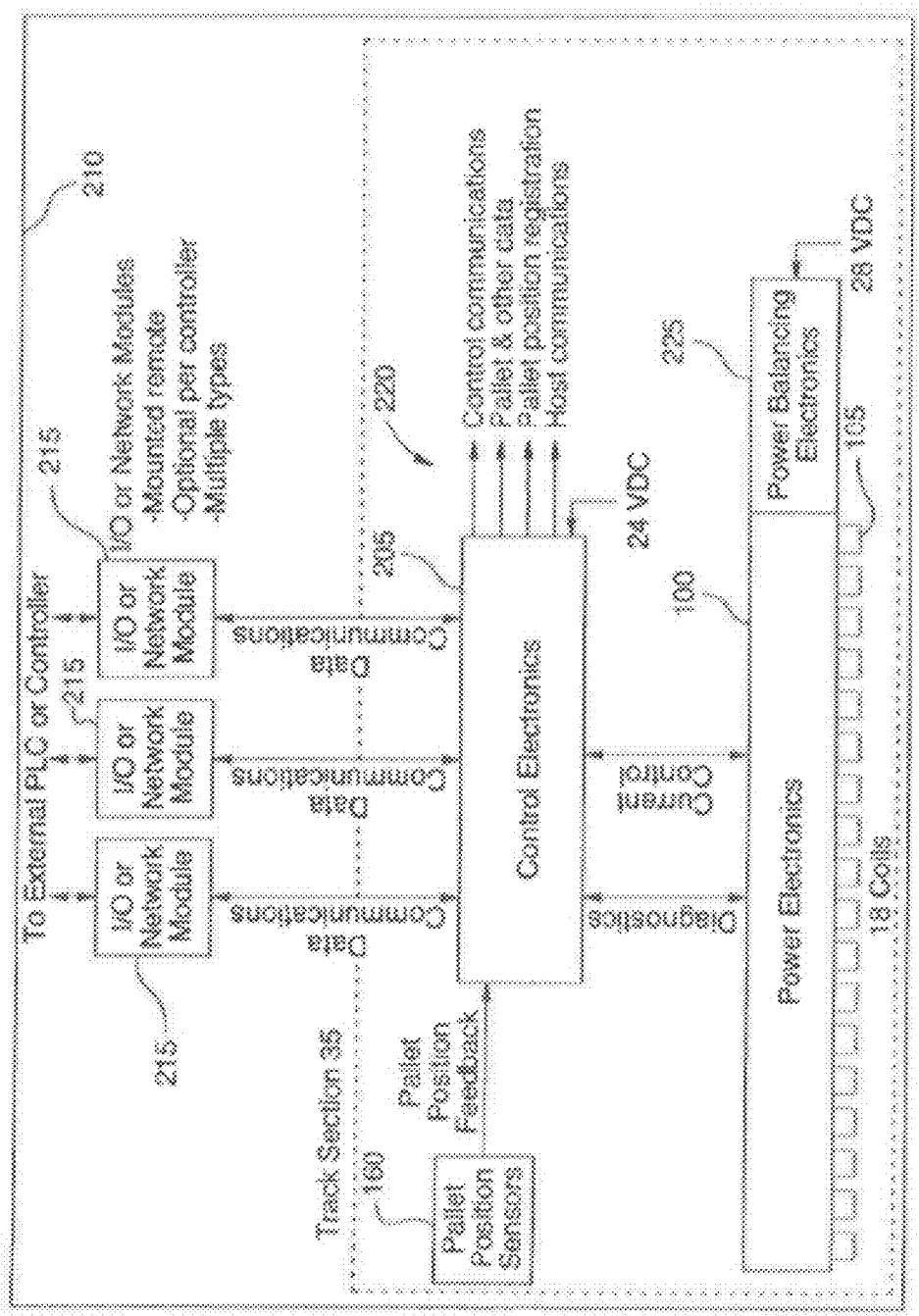

FIG. 7B is a block diagram of an example control system 210 for a track section 35. The control system 210 includes the section controller 205 that is connected to the central controller 200 via, for example, an input/output (I/O) or network module 215. In this embodiment, the section controllers 205 are connected to one another in a peer-to-peer communications network such that each section controller 205 is connected to preceding and following section controllers 205 through communications link 220. It will be understood that other alternative embodiments may include use of the central controller 200 to convey information/data between section controllers 205 or the like.

The section controller 205 may also be connected to other devices, such as programmable logic controllers (PLCs) (not shown) via, for example, input/output (I/O) or network modules 215. The PLCs may provide manufacturing-line station-processing instructions to the track section 35, such as directing the next destination for a moving element 50 along the track 75, or providing station-specific motion instructions in respect of a given moving element 50 stopped adjacent to a workstation 60. For instance, a typical two-axis station controller or PLC may operate by providing pulse signals in order to synchronize the motion of a moving element 50 along the track 75 with the motion of a station end effector (not shown) or the like moving along a transverse axis, whereby each pulse represents an incremental move command for the moving element 50. It will be appreciated that the provision of the direct connection to the PLC reduces the amount of bandwidth that would otherwise be required to communicate this information through the central controller 200, thereby substantially eliminating a potential limitation on the length and processing capabilities of the track section 35.

As illustrated, each section controller 205 is connected to the stator armature 100 and coils 105 in the corresponding track section 35 and controls the coils 105 independently, in order to control an adjacent moving element 50, for example, with an independent trajectory or "move" command.

Each track section 35 also includes power balancing electronics 225 that may include, for example, current amplifiers, current sensing circuitry, temperature sensor, voltage sensors and the like. The section controller 205 may periodically poll the power balancing electronics 225 in order to obtain diagnostics data provided by these sensors.

Each section controller 205 is also connected to the encoder read heads 160 situated in the track section 35. The section controller 205 is used to implement a closed-loop digital servo control system that controls movement of the moving element 50 by resolving the absolute position of each moving element 50 located in its track section 35. The section controller 205 makes use of a moving element position feedback subsystem, which supplies measured moving element position data to the section controller 205. Referring to FIGS. 4A, 4B and 5, when the encoder strip 155 of a given moving element 50 moves over a given encoder read head 160, signals are produced and cause the section controller 205 to update the position of the moving element 50 in accordance with the direction of travel of the encoder strip 155. The section controller 205 provides processing for sampling the encoders 160 and resolving the position of each moving element 50 located in the associated track section 35. Broadly speaking, the processing associates the encoder strip 155 of any given moving element 50 with only one encoder 160 at any time so that the absolute position of the given moving element 50 can be calculated based on a fixed position of the associated encoder (or more specifically its read head 160) and a relative position of the encoder strip 155 in relation to the associated encoder 160. In addition, when the encoder strip 155 simultaneously engages two encoders 160, the processing transfers or hands-off the association or "ownership" of the moving element 50 from the current encoder 160 to an adjacent engaged encoder 160. In this manner, the position of a given moving element 50 can be continuously tracked across the control zone. When a moving element 50 crosses control zones, a similar process occurs, with the addition that the adjacent section controller 205 creates a data structure to keep track of the position of the given moving element 50, and, once the hand-off is completed, the data structure for the moving element 50 in the (now) previous control zone is deleted.

As one example, if a 400 lines-per-inch graded encoder strip 155 moves one inch through a given encoder read head 160, such movement will cause an associated counter to change by +/−400, depending on the direction of travel. This type of encoder read head 160 as well as the associated encoder strip 155 are commercially available, for instance, from US Digital of Washington, U.S.A. The encoder strip 155 may further include an incremental encoder portion (not shown) having a plurality of index points staggered along the strip such that the moving element 50 can be located based on reading as few as two index points.

Those skilled in the art will appreciate that the encoder system 157 may be optical or may be another alternative system. For example, a passive readable device can be a magnetic strip and the encoder read heads can be corresponding magnetic detectors. Such an alternative embodiment may provide very fine resolution.

When dealing with magnetic linear drive systems such as that described above, one issue can be the addition or removal of the moving elements 50. In order to overcome this concern, a modular track section may be provided with an extension, for example, approximately 300-600 mm (12-24 inches) long, that is not provided with an encoder or motor section. For removal or addition, the moving element 50 can be manually moved to this extension section and removed or placed on this extension section and pushed back onto a powered track section.

In the situation where there is a failure of the system of some kind and it is necessary to reset the system in order to identify individual moving elements 50 and locations, a process can be used to reorient the moving elements 50 of the system. In a particular embodiment, all moving elements 50 can be manually moved to a downstream position. On startup the system can move all moving elements 50 upstream to a pre-programmed target position at which point moving element IDs can be assigned sequentially from a programming logic controller. After the ID is assigned, the moving elements 50 can be released by the PLC to go to a dedicated pick position target. In some cases downstream moving elements 50 may be released to upstream holding targets until the most downstream moving element 50 has been sent to its pick position target. It will be understood that the number of holding targets will depend on the physical layout. This type of recovery sequence can be coordinated by the PLC and has the benefit that no RFID or IR or other moving element ID system is generally required.

Each track section 35 or each combination of track sections 35 can be provided with both mechanical and software limits in order to prevent moving elements 50 from running off at the end of the track section 35 or combination of track sections 35.

As the modular conveyor system 20 includes both powered track sections and mechanical infeed and outfeed conveyors, operator stations can be provided outside of a guarded area that may be provided for the higher power track sections 35 which provide the independent control. This provides for greater safety for operators. The use of mechanical infeed and outfeed conveyors allows for more buffering flexibility in between areas on the manufacturing line. For example, a conventional conveyor may be placed in between two linear-drive areas to allow for cheaper buffering if one linear-drive area is stopped for any reason. The appropriate use of buffering can improve overall equipment effectiveness (OEE).

This combination modular conveyor system 20 has advantages over conventional systems in that the pallet size is not limited by the chassis pitch and multiple parts can be provided on one pallet. On the track sections 35, each moving element 50 can be moved independently to allow for offsetting at one workstation 60 while performing a multi operation at another workstation 60, and full access to the part from all sides is provided within the track sections 35. Further, because of the accurate indexing on the track sections 35, the moving element 50 may provide x-axis movement to provide for coordinated motion with y and z axes devices at the workstation 60.

Embodiments of the modular conveyor system 20 are generally intended to provide a number of advantages over conventional conveyor systems. For example, the use of relatively inexpensive conventional conveyors for part transport reduces costs while the independently controlled moving elements 50 of the track section 35 can be used for precise control of position. Further, the electromagnetic structure of the track sections 35 provides smooth thrust and high speed while maintaining accurate positioning. Furthermore, the distributed control system enables each moving element 50 to be individually and separately controlled yet interface easily with manufacturing process controllers for infeed and outfeed conveyors. Finally, the conveyor system 20 can be constructed out of discrete, self-contained, modular track sections 35 and infeed and outfeed conveyors, with little practical restriction on the length of the conveyor system or the number of moving elements 50 controlled thereby.

Figure 8:
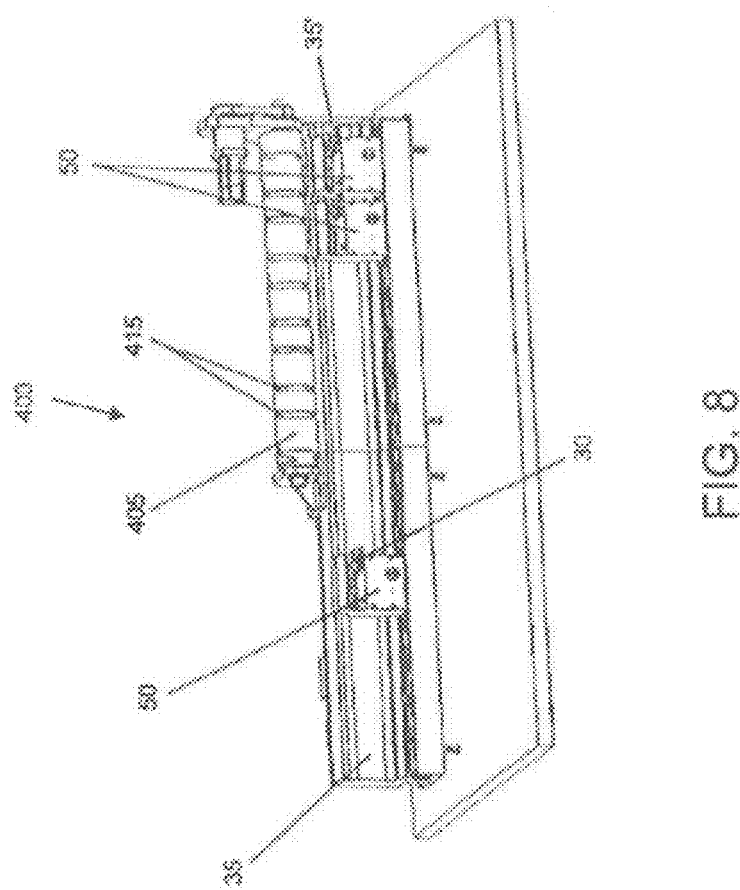
FIG. 8 illustrates another embodiment of a modular conveyor system in which a powered track section is used with an unpowered track section including a scroll cam drive system.

FIG. 8 shows a further embodiment of the use of modular track sections 35 together with a mechanical conveyor 400. In this case, rather than a conventional belt conveyor, the mechanical conveyor 400 comprises a scroll cam 405 provided to a modular track section 35' that has had the linear drive removed (or alternatively, turned off), referred to as an unpowered track section 35'.

An intended advantage of the embodiment of FIG. 8 is being able to run non-synchronous (powered track section) to synchronous (unpowered track section) without a change over to a different track system. It is possible to run smoothly from non-synchronous to synchronous (sometimes called "continuous motion") and back to non-synchronous or alternatively, to start with synchronous and then to non-synchronous, all in a single modular track environment. It will be understood that the modularity of the track sections 35 and 35' make it possible to have any required number of drive system changeovers succeeding one another in order to create an assembly line or the like.

Figure 9:
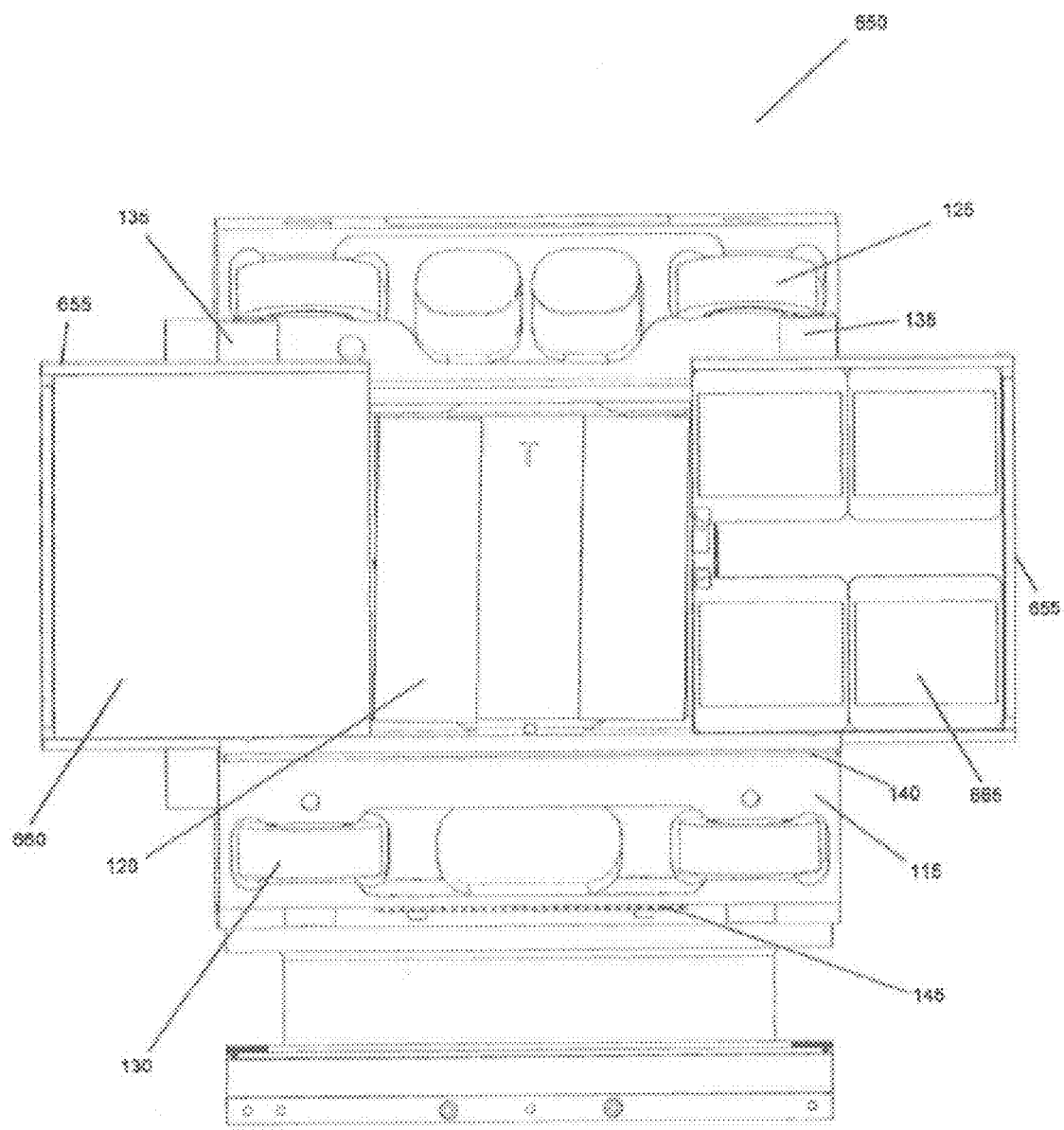
FIG. 9 illustrates a perspective view of a moving element according to another embodiment.

FIG. 9 illustrates another embodiment of a moving element 650. Similarly to the moving element 50 shown in FIGS. 4A, 4B and 5, each moving element 650 includes a body 115, which houses at least one permanent magnet 120. The at least one magnet 120 provides a magnetic flux orientated normal to the track section 35. Other elements of the moving element 650 are also similar to the moving element 50, unless otherwise indicated.

In this alternative embodiment of the moving element 650, shown in FIG. 9, the moving element 650 is provided with at least one induction panel 655. In some cases the induction panel 655 may be referred to as an energy pick-up element or an inductive pick-up element. In this case, the induction panel 655 is provided to and protrudes from the body 115 of the moving element 650. As shown in FIG. 9, two induction panels 655 are incorporated on either side of the moving element 650, and adjacent to the at least one magnet 120 in the longitudinal direction of the track section 35. This arrangement can allow for a balancing of the provision of inductive power as explained in further detail below.

The induction panels 655 include at least one induction pick-up coil 660. The induction panel 655 may also include one or more ferrite cores 665. The field of induction coils is well known and an appropriate coil and/or ferrite core arrangement can be chosen depending on the required power transfer.

As noted above, the linear drive mechanism 95 used in the present embodiment allows for individual control over each linear motor coil 105 in a track section of the transport system (for example, 18 coils per 900 mm section), see, for example, FIG. 3. This individual control allows each moving element 650 to be directly controlled by the linear motor coils 105 that are in the vicinity of the moving element 650. Linear motor coils 105, which do not have a moving element 650 in their vicinity, are generally controlled to produce no substantial magnetic field.

This individual control over each linear motor coil 105 contrasts with conventional magnet linear motors, which typically connect groups of coils in a series/parallel arrangement to produce one or more sections in which all of the moving elements on a single section experience the same motive forces and thus move substantially together as a group. In these conventional systems, only moving elements on different sections can be moved independently.

In the present embodiment, the linear motor coils 105 are normally driven using pulse width modulation (PWM) at a higher frequency, for example 20 kHz, in order to provide an electromagnetic field to drive the moving elements 650. The higher frequency of modulation is used such that, when combined with the coil inductance, the linear motor coil 105 produces a generally smooth magnetic field with relatively little AC ripple. This is advantageous to reduce eddy current losses and because excessive magnetic ripple could cause vibrations of the moving elements and make accurate positional control difficult.

In order to be able to provide inductive power transfer, however, an alternating electromagnetic field is required to couple a source coil, (in this case, the motor coils 105) and a pick-up coil. As described below, placing pick-up coils 660 just before and after the magnets 120 of the moving element 650 and reducing the frequency of PWM for motor coils 105 in the vicinity of the pick-up coils 660, inductive power transfer can be implemented without significant additional materials and without significant impact on the position control system.

Since the use of the linear motor coils 105 to drive the moving elements 650 is designed to minimize ripple by providing a smooth magnetic field and stable positioning (for example, using 20 kHz modulation), the AC ripple component of the linear motor coils 105 would generally be insufficient to couple any useful amount of power to the pick-up coils 660. However, by reducing the modulation frequency (for example, to approximately 1 kHz) of only the linear motor coils 105 under the pick-up coils 660, the AC ripple component (i.e. varying electromagnetic component) of the field can be increased to allow appropriate levels of power to be transferred to the pick-up coils 660 of the moving element 650.

Figure 10:
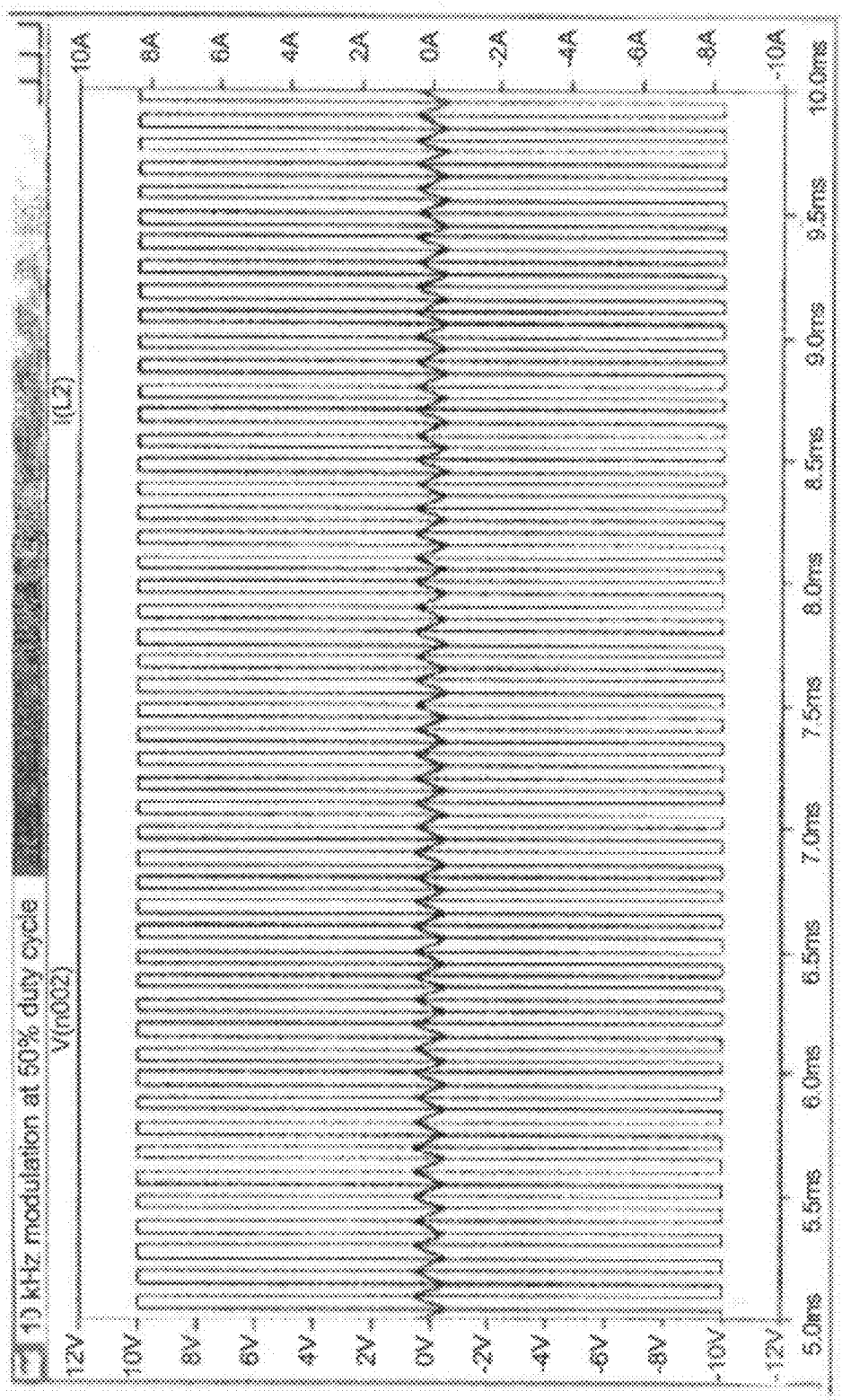
FIG. 10 shows a graph illustrating the average current at a 50% duty cycle and 10 kHz modulation frequency.

FIGS. 10 to 13 illustrate graphical representations of the effect of modulation frequency and pulse width modulation duty cycle. FIG. 10 illustrates a motor coil regulated at 50% duty cycle and 10 kHz modulation frequency. It can be seen that the average current is zero and that there would be a small ripple current. A motor coil (105) operating in this way would typically not have an impact on a moving element 650 because the average current is zero (i.e. no net magnetic field, which would mean no force and therefore no movement) and minimal ripple current (i.e. no power induction).

Figure 11:
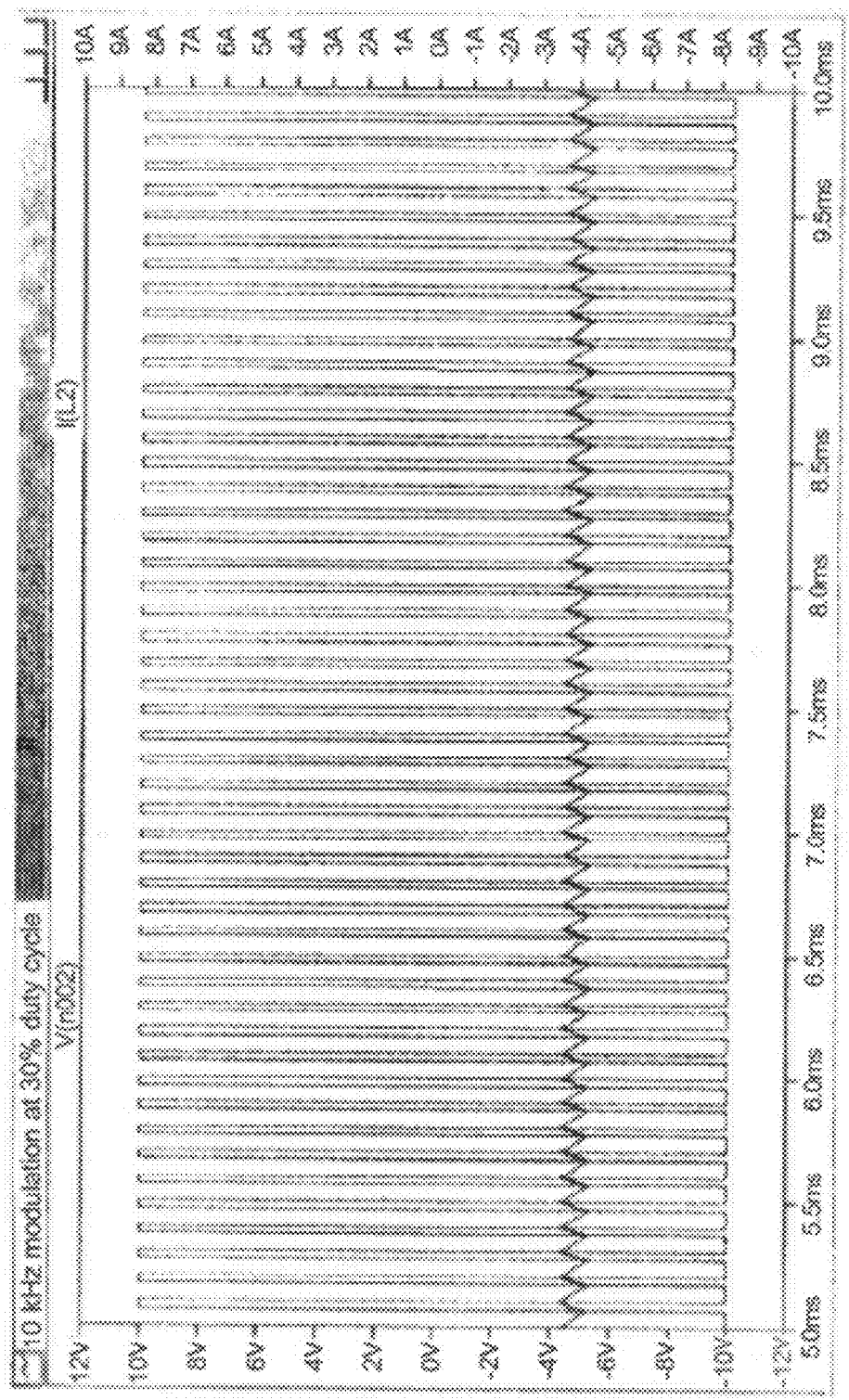
FIG. 11 shows a graph illustrating the average current at a 30% duty cycle and 10 kHz modulation frequency.

FIG. 11 illustrates a coil at 30% duty cycle and 10 kHz modulation frequency. In this case the average current can be seen at negative 4 amps. In this case, there will be a net magnetic field and the moving element 650 will move accordingly. Note that a full range of duty cycle may be used, 99% for maximum forward force and 1% for maximum reversing force. As in FIG. 10, there is a small ripple current of a similar magnitude. The net resulting magnetic field may still have a ripple component but will have a predominant offset value, which will apply an accelerating force to the moving elements in the vicinity. Similar to the situation in FIG. 10, a pick-up coil placed in the low ripple magnetic field generated as shown in FIG. 11 would have negligible voltage induced in it.

Figure 12:
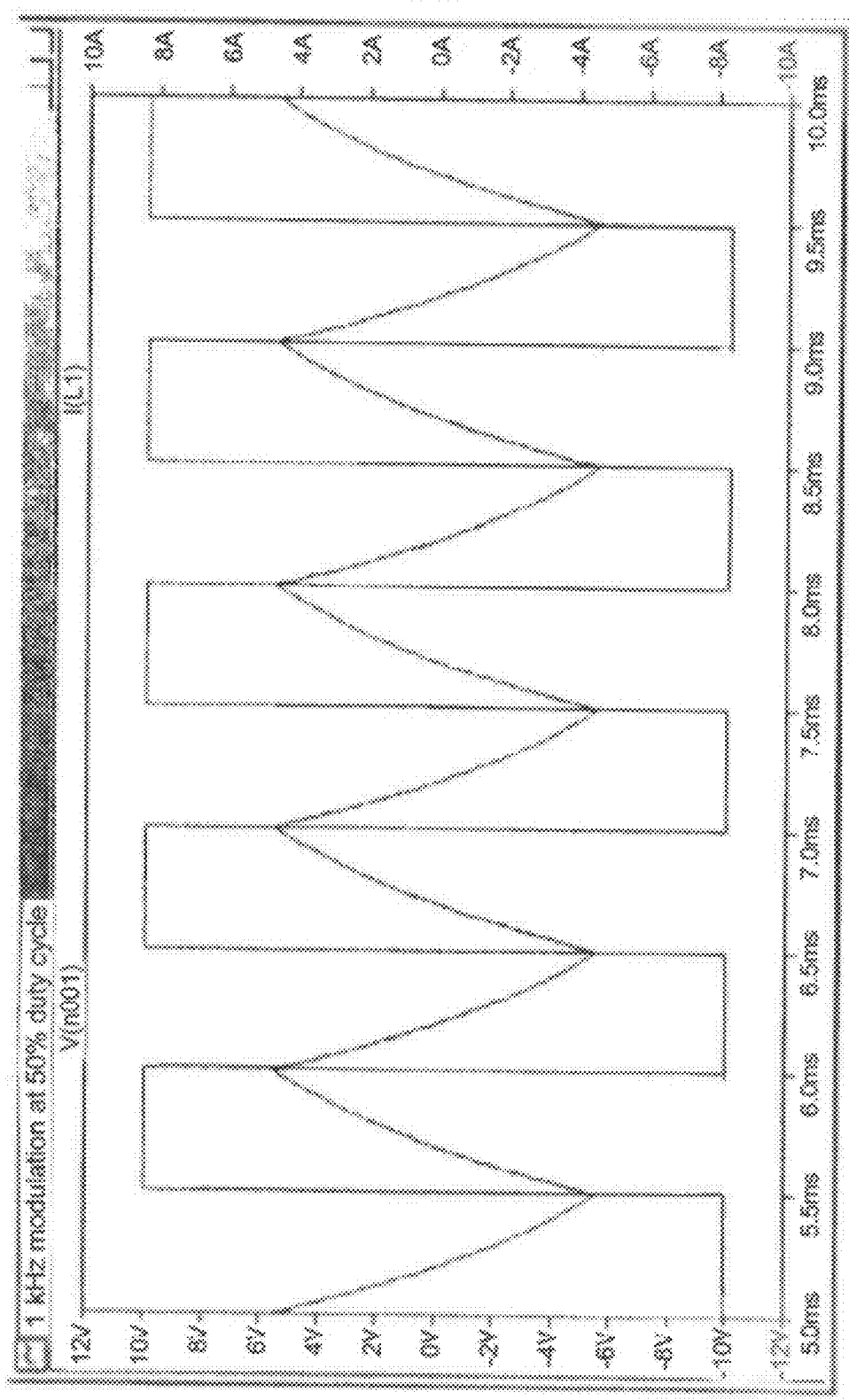
FIG. 12 shows a graph illustrating the average current at a 50% duty cycle and 1 kHz modulation frequency.
Figure 13:
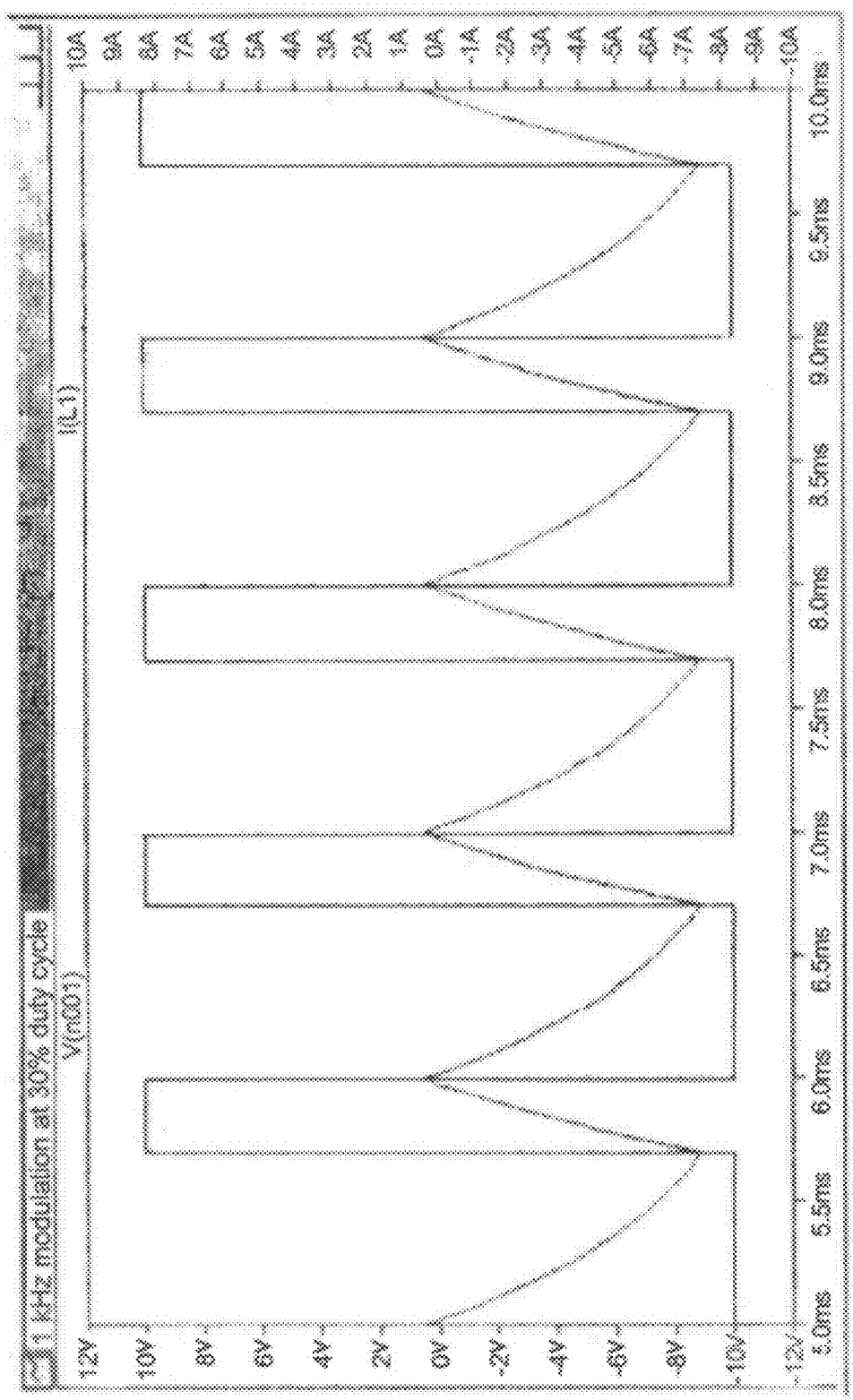
FIG. 13 shows a graph illustrating the average current at a 30% duty cycle and 1 kHz modulation frequency.

FIG. 12 and FIG. 13 show a coil at a 50% and 30% duty cycle respectively, both at a 1 kHz modulation frequency. At this modulation frequency a larger ripple current is created. At a 50% duty cycle, the net resulting magnetic field has a significant alternating (ripple) component, but the average field remains zero. A pick-up coil in this magnetic field would have an alternating voltage induced in it but the average magnetic field (accelerating force) would remain at approximately zero. At a 30% duty cycle, the net resulting magnetic field has a predominant offset value as well as a significant alternating (ripple) component. The offset value has an accelerating force on the moving elements 650 in the vicinity. As above, a pick-up coil placed in this magnetic field would have an alternating voltage induced in it. Thus, the use of a lower modulation frequency can provide power to pick-up coils, while limiting the impact on the positional stability or movement of the moving element.

The selection of the higher and lower frequencies depends on variables, including, for example, motor inductance, pallet air gap, pickup inductance, and coil drive electronics. For some cases, a nominal PWM frequency range may be between 10 and 30 kHz for moving the moving elements 650 and a range of 0.5 to 7.5 kHz may be used during power transfer. In other cases, the nominal PWM frequency range may be between 20 and 22 kHz for moving elements 650 and the range used for power transfer may be between 4 and 6 kHz. For one specific case, 21.5 kHz is the PWM nominal frequency and 5.375 kHz is used during power transfer.

As a moving element 650 moves along the track section 35, the control electronics 205 control the operation of the linear motor coils 105 to both move and position the moving element 650 and provide power to the moving element 650. In particular, the control electronics 205 control which linear motor coils 105 should be modulated at reduced frequency so that power is continually transferred to the moving element 650. As there is individual control over the linear motor coils 105, the linear motor coils 105 that have no moving element 650 (or, more precisely pick-up coil 660) over or near them will produce little AC or DC electromagnetic field and, in appropriate cases, may be turned off resulting in power savings.

FIGS. 14A to 14D are diagrammatic representations of an example of the movement and provision of power to a moving element. In this figure, motion is from left to right. All linear motor coils 105 or portions of these coils, which are under the magnet poles 700 at any point in time, may be modulated to produce the force required to maintain the moving element 650 at its desired position.

Figure 14A:
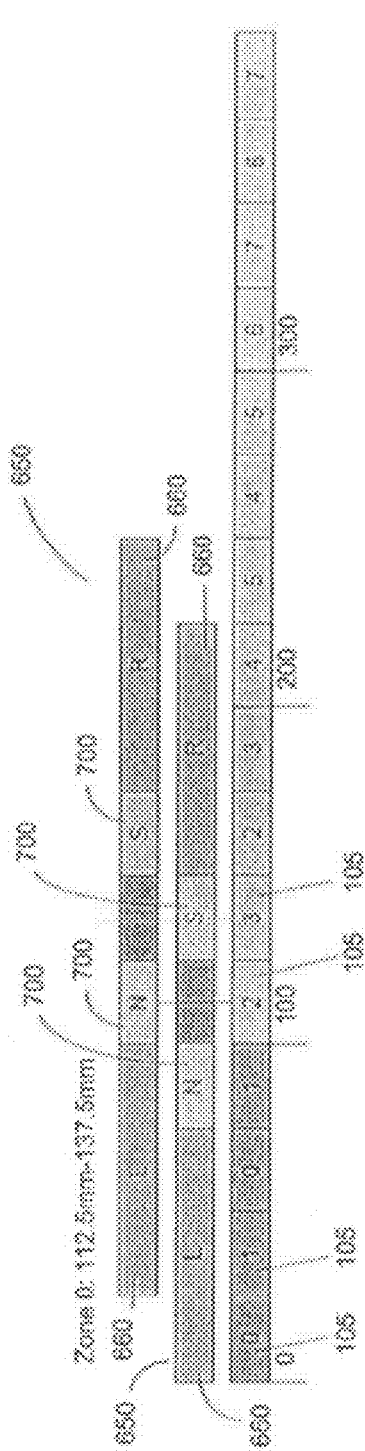

In FIG. 14A, the upper two bars represent the moving element at two different times; in this figure the moving element 650 is shown in transition from 112.5 mm to 137.5 mm. The upper bar shows the moving element 650 after the moving element 650 is advanced 25 mm in relation to the lower bar. The left and right pickup coils 660 are labelled L and R, the magnet poles 700 are labelled N, for north and S for south, and the dark gray portion in the middle of the moving elements is a physical gap. The third (lowest) bar in FIG. 14A represents the motor coils 105 of the linear motor. FIG. 13 shows a detail view of the motor coils 105 in relation to the diagrammatic representation. On the third bar, the darker motor coils 105 labelled 0 and 1 are being modulated at reduced frequency to induce power transfer into pickup coil L, while the remaining coils, labelled 2 and 3, are being modulated at the normal frequency for position control. Each of FIGS. 14B, 14C and 14D use a similar arrangement.

Figure 14B:
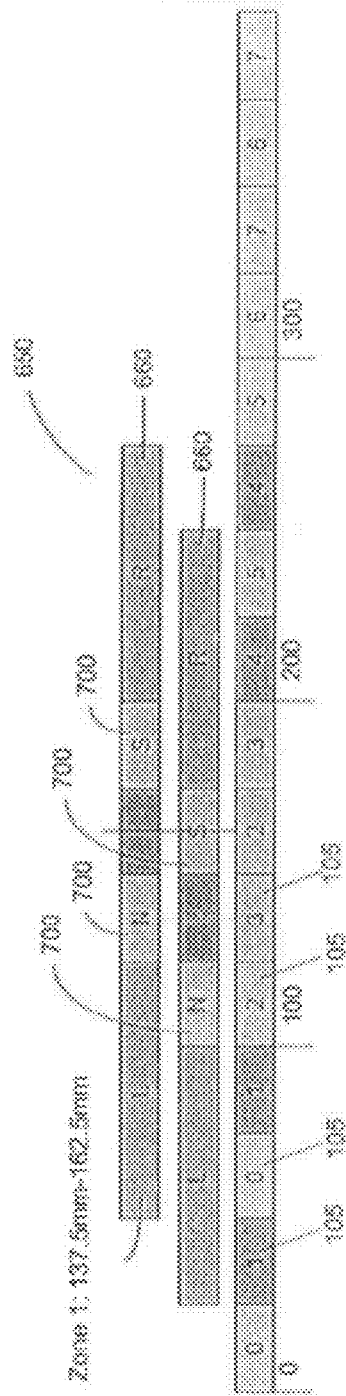
Figure 15:
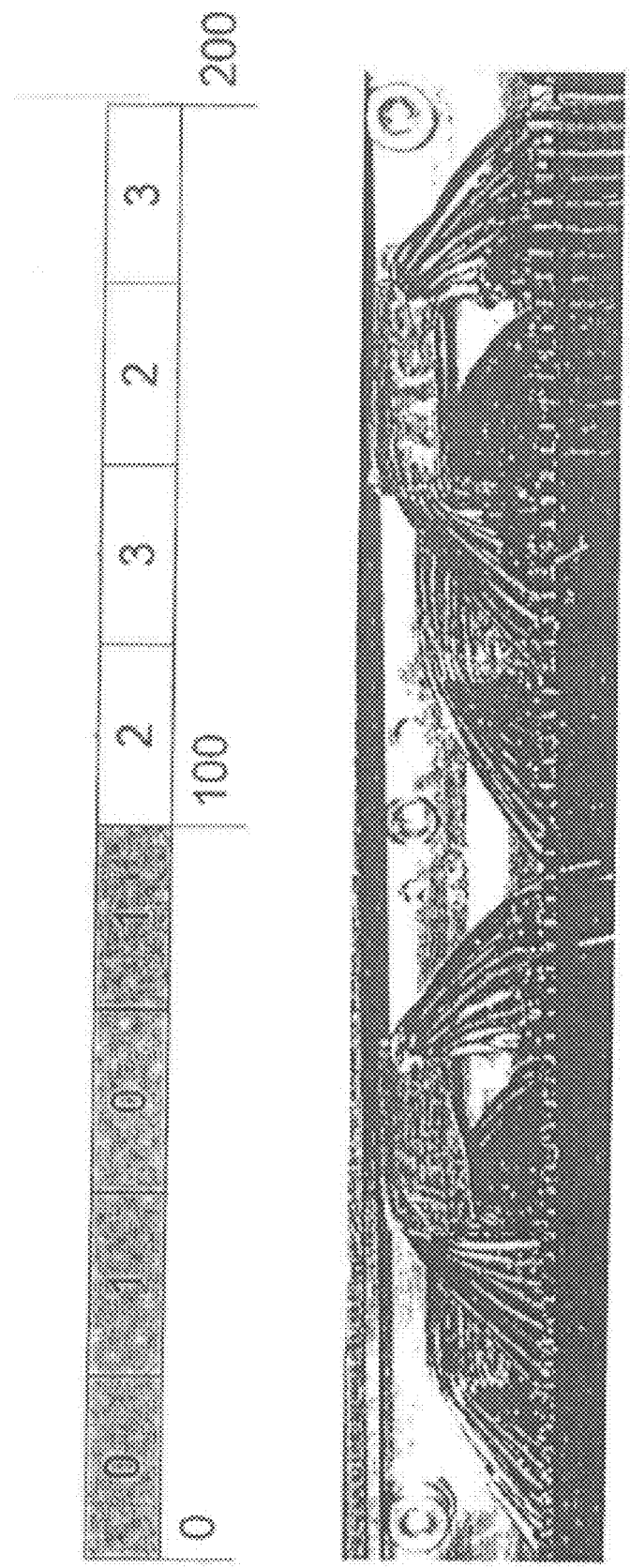
FIG. 15 illustrates coils of a linear motor in relation to the diagrammatic representation of FIG. 14.

In FIG. 14A, power is provided to the moving element 650 from motor coils 0 and 1 via the left pick-up coil 660. In FIG. 14B, coils 2 & 3 of the motor coils 105 are modulated to provide the motive force and power is transferred to the moving element from motor coils 1 and 4 via both the left and right pick-up coils. FIGS. 14C and 14D are similar and illustrate the way that power is continuously provided to the moving element even while moving.

The combination of two outboard pickup coils and the above reduced frequency modulation scheme may allow for a near constant voltage to be available on the moving element, irrespective of the position of the moving element and without the need for any on-pallet energy storage. With near constant voltage, jittering in position is intended to be reduced.

The motor coils 105, when located under the magnet poles 700, produce the positioning force and may be duty-cycle modulated based on how quickly a moving element 650 is required to change its position. A 50% duty cycle could correspond to idling, while 99% may be full acceleration and 1% may be full acceleration in reverse. The motor coils 105 located under the induction panels 655 provide power to the moving element. In one embodiment, approximately 10 watts of power may be transferred to a moving element 650 without resulting in any degradation in position control. Slightly more heat may be generated in the motor coils 105. Transferring larger amounts of power may result in shaking and jittering of the moving element 650, loss of positional accuracy and excessive heat losses in the motor coils. It will be understood that less or more than 10 watts of power may be provided depending on the design parameters of the transport system. Further, because of individual control of the motor coils 105, different levels of power may be provided to individual moving elements 650 even on a single track section of the transport system. The ability to control the power of each individual moving element may be advantageous in many situations, for example, when there are different power requirements at different stations within an assembly line.

In another embodiment, on a transport system in which all the moving elements on a specific track section do not have independent control, power transfer may occur to the moving elements by changing the pulse width modulation frequency of the track section once the moving elements have reached their desired position. This would allow power transfer to the moving elements 650 from the motor coils 105 when the moving elements 650 are held in position.

Transport systems as described above can provide electrical power to elements located on a pallet, thereby doing away with the need for power sources located on the pallet. As discussed above, appropriately selecting modulation frequency and pulse width modulation duty cycle can provide the force required to move the moving element and provide power induction to the pick-up coils. Power induction provided to the pick-up coils can be used to power devices or the like located on the pallet.

Interestingly, the power induction may also be used to power position adjustment systems for adjusting the position of a workpiece or the like on the pallet. In some embodiments, the position adjustment systems (sometimes called "movement systems") may include, for example, ceramic servo motors. Such servo motors can be used to shift a work plate located on the pallet (and an associated workpiece on the work plate) in various directions, including, if appropriate, the pallet travel path, and/or could be used to rotate the work plate (and associated workpiece). In some cases, movement along the pallet travel path can be adjusted by moving the moving element directly. Shifting and/or rotating the work plate and workpiece on the pallet is expected to be beneficial for many operations, including, for example, vision inspecting, UV testing, engraving, laser welding, and the like, where it is useful to adjust the work piece position and/or angularly position the workpiece at a particular station on a conveyor or transport line.

Using servo motors may allow for movement of a work plate and associated workpiece that is more precise than the movement associated with moving element 50 along track 75. Additionally, synchronously and/or sequentially activating a combination of motors that impart rotary and/or XY-linear movements to the work plate and associated workpiece, may allow the position adjustment system to move the workpiece into any orientation within the available envelope of travel.

Doing away with the need for a separate power source located on the pallet can be beneficial since, for example, a heavier pallet (i.e. a pallet with a power source, for example a battery, located on the pallet) requires more energy to accelerate and decelerate than a lighter pallet (i.e. a pallet without a power source located on the pallet). Lighter pallets can result in more reliable transport systems and, consequently, less down time.

Providing electrical power using induction, as described above, can be beneficial over providing electrical power using physical connectors (for example via shot pins) since induction provided electrical power can be provided while a pallet is in motion. In contrast, physical connectors like shot pins require that the pallet be stationary before the external power source can be engaged.

Figure 16:
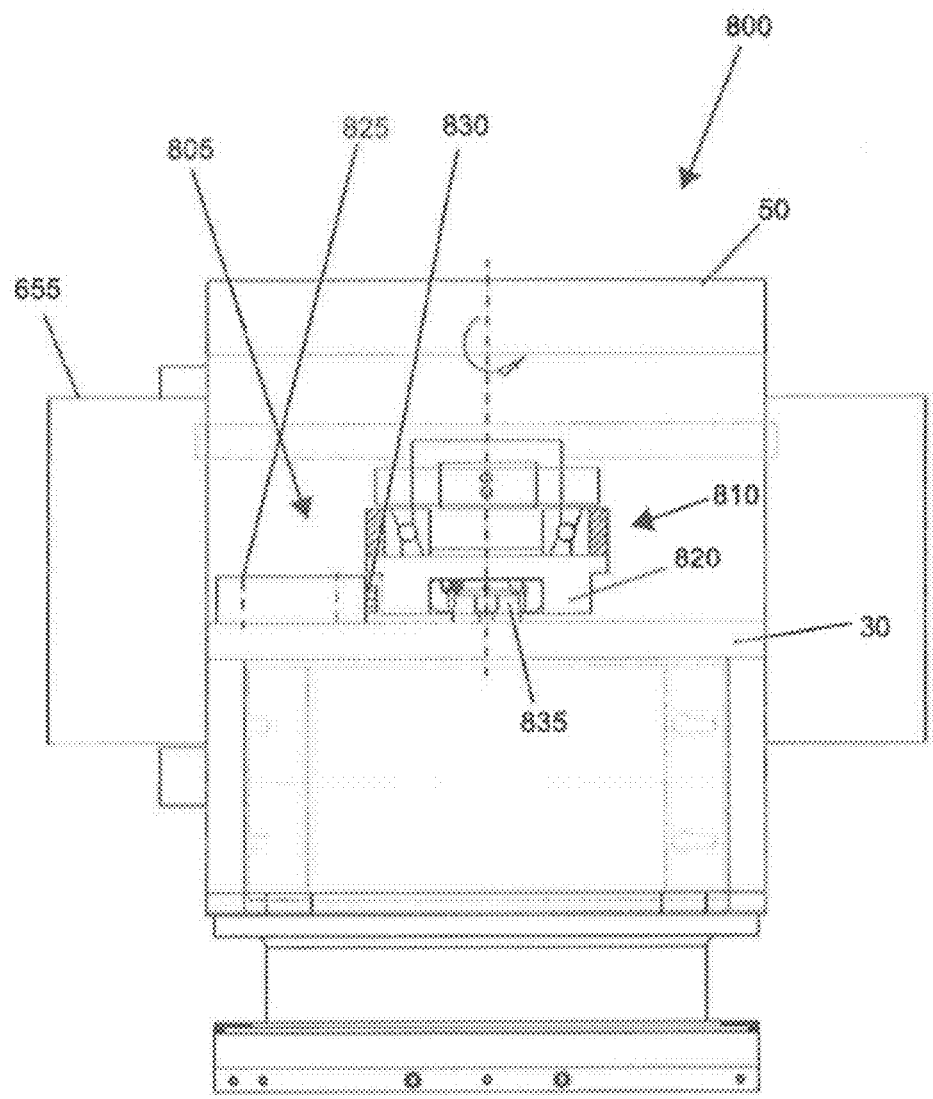
FIG. 16 is a front view of an embodiment of a pallet having electrically powered motors located thereon.
Figure 17:
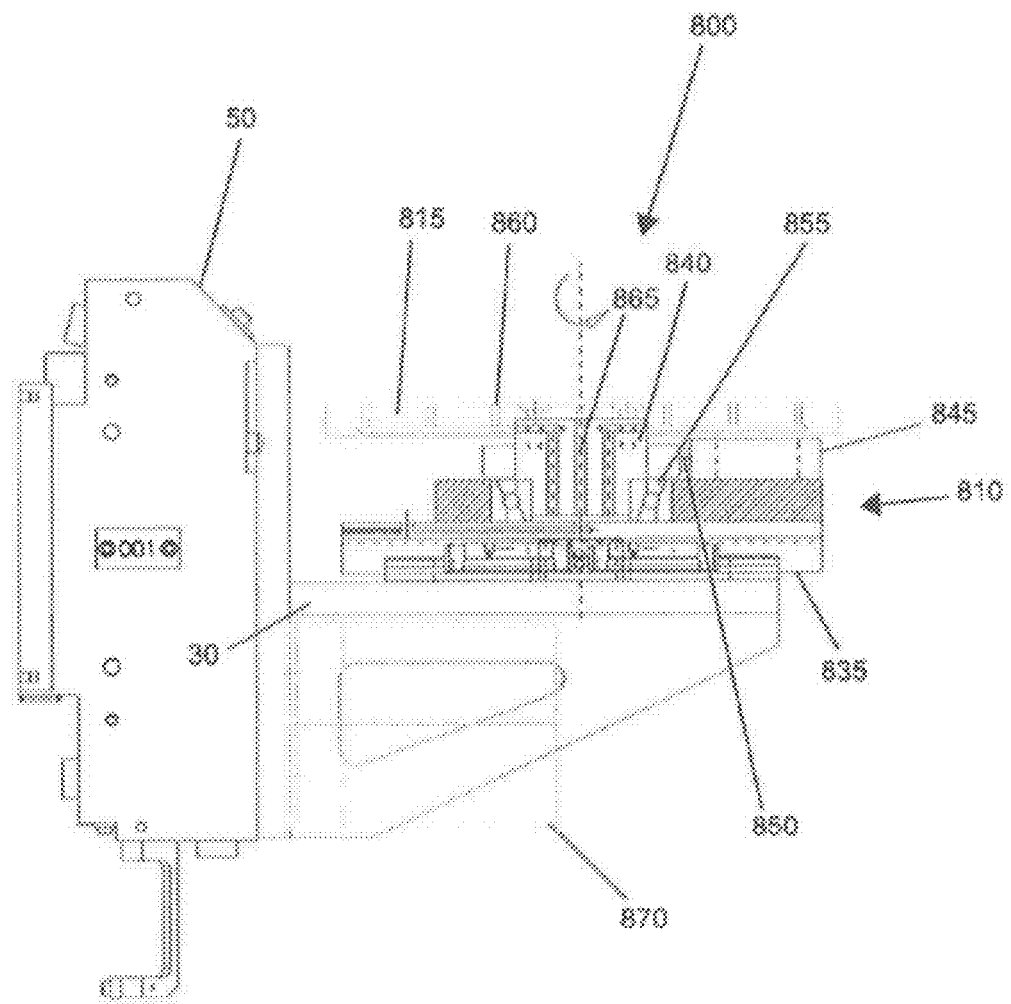
FIG. 17 is a side view of the embodiment of FIG. 16.

One example of a transport system that includes electrical power which is inductively provided to a movement system 800 on the pallet is illustrated in FIGS. 16 and 17 (front and side views respectively).

In the embodiment illustrated in FIGS. 16 and 17, the moving element 50 supports a pallet 30 that is provided with a movement system 800 including a linear direction subassembly 805, a rotational subassembly 810 mounted on the linear subassembly 805, and a work plate 815 mounted on the rotational subassembly 810. The linear subassembly 805 provides adjustment of the work plate 815 along a horizontal axis perpendicular to the pallet's axis of travel; and the rotational subassembly 810 provides for rotating the work plate 815 around a vertical axis.

As shown in FIG. 16, the linear subassembly 805 includes a linear platform 820, a first ceramic motor 825, and a first ceramic strip 830 provided to the linear platform 820 for interacting with the ceramic motor such that the linear platform moves linearly when the first ceramic motor is activated. The linear subassembly 805 may include a linear rail 835 that can interact with the linear platform to support and guide the linear platform.

As shown in FIG. 17, the rotational subassembly 810 is provided on the linear platform 820 such that the rotational subassembly will move with the linear platform. The rotational subassembly includes a disk platform 840, a second ceramic motor 845, and a second circular ceramic strip 850 provided to the disk platform for interacting with the second ceramic motor such that the disk platform rotates when the second ceramic motor is activated. The rotational subassembly also includes a rotary bearing 855 to support the disk platform and allow the disk platform to rotate smoothly and precisely.

Workpieces (including for example, tooling, fixtures, parts or other items) can be attached on the work plate 815. In this embodiment, the work plate includes passages 860 to allow fluid flow to/from the work plate 815. Passages 860 may be fluidly connected to central vertical passage 865 which passes through the rotational subassembly 810 and may be used as a passage to drain liquids which may be spilled from workpieces during transportation.

FIG. 17 shows that components 870 related to the movement system such as amplifiers, controls (such as printed circuit boards and processors) and the like may be provided in a space under the pallet.

Figure 18:
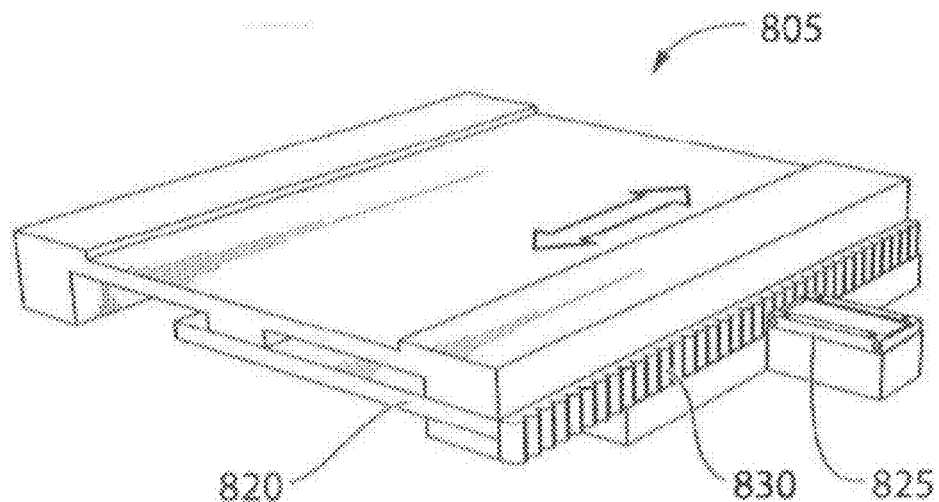
FIG. 18 shows an example of a linear direction subassembly.
Figure 19:
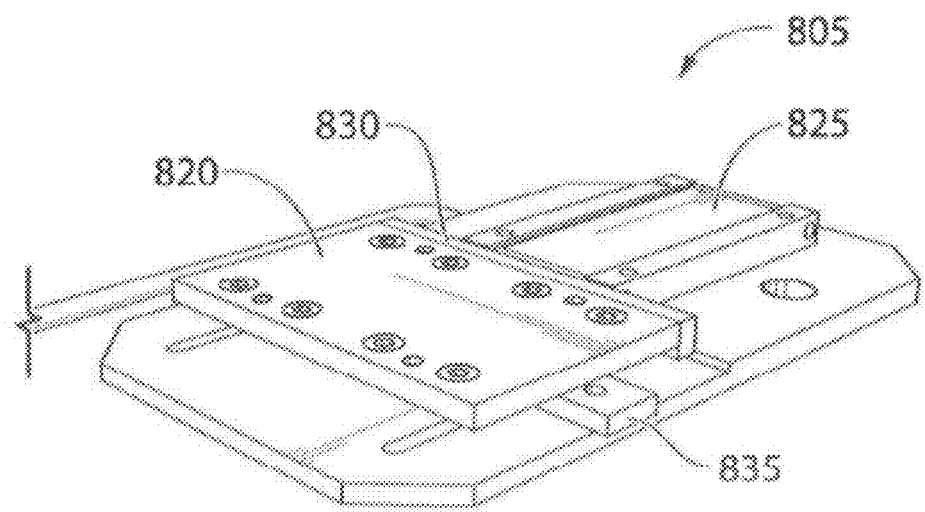
FIG. 19 shows another example of a linear direction subassembly.
Figure 20:
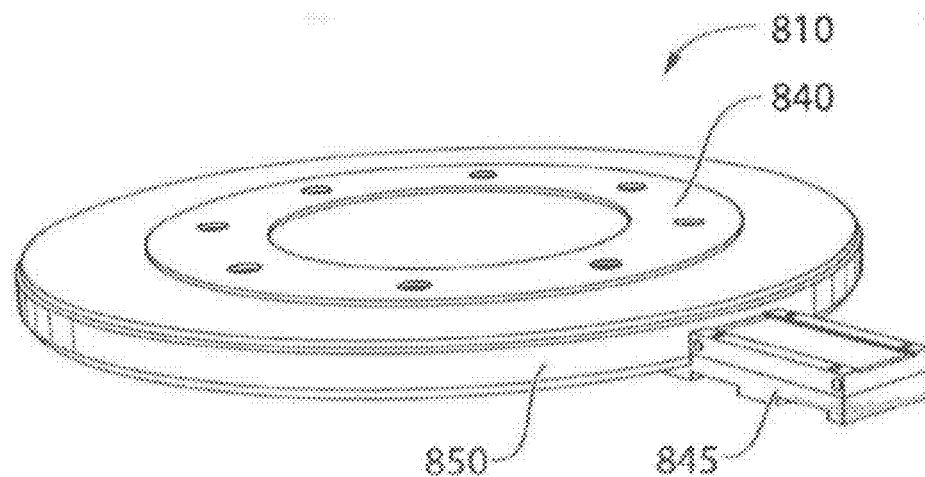
FIG. 20 shows an example of a rotary motion subassembly.
Figure 21:
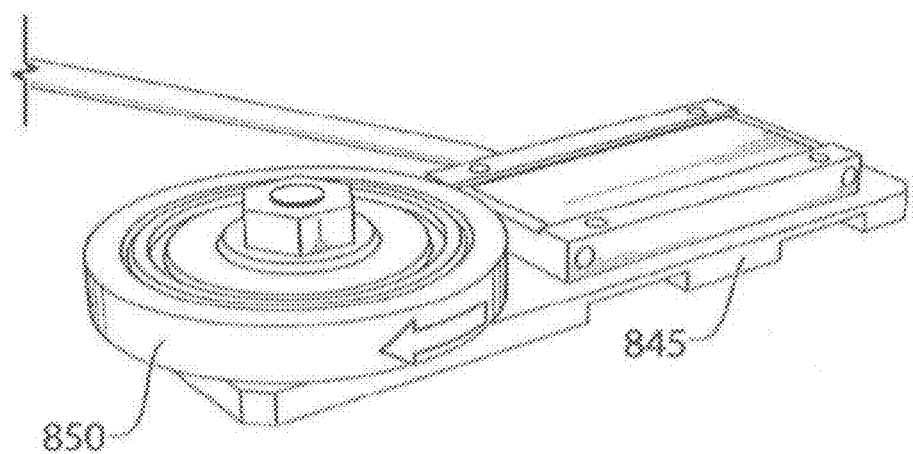
FIG. 21 shows another example of a rotary motion subassembly.

Examples of linear subassemblies are shown in FIGS. 18 and 19. In FIG. 18, the linear subassembly is shown with a larger linear platform. In FIG. 19, the linear subassembly is shown with what could be considered a smaller linear platform or alternately a support for a linear platform. Examples of rotational subassemblies are shown in FIG. 20 and FIG. 21. FIG. 20 shows a rotational subassembly with a disk platform and having the drive strip along the outside of the disk platform, while FIG. 21 shows a rotational subassembly without a disk platform mounted and having a drive strip around a smaller support for a disk platform.

In this embodiment, the work plate (and thus workpieces, tools, fixturing and the like on the work plate) can be linearly adjusted along an axis (called the y-axis) using the linear subassembly and rotated about an axis (called the z-axis) using the rotational subassembly. Further, the work plate can be adjusted in the direction of the motion of the pallet (called the x-axis) by moving the moving element 50.

Although ceramic motors are used in the embodiments above, other types of motors may also be used, for example solenoids. The motors are preferably lightweight motors, such as the ceramic motors shown, for example piezomotors/ceramic nano-drive systems and provide high precision for micro-adjustability of the work plate. The motors can be continuous motors or step motors.

As noted above, controls for the motors may be provided on the pallet or, alternatively may be provided with the movement system or remotely. The controls may include programmable features to cause the movement system to adjust the position of the work plate in multiple simultaneous directions at programmed velocities/accelerations, depending on the requirements. The controls, logics and sequencing may be part of the total machine control system and may be interfaced with other components of the system, particularly devices that interface with workpieces carried on these assemblies.

One of skill in the art will understand, based on the details herein, that, if needed, a further linear subsystem could be provided in the case that x-axis movement can not be provided by the moving element 50. Further, additional degrees of freedom of movement could be added, such as, for example, a linear subsystem for linear movement in the z-axis direction or a rotational subsystem for movement about other axes to, for example, adjust the angle of the work plate. One of skill in the art would understand that an angle being adjusted would not need to be planar with respect to the XY plane of the main plate of the pallet. Still further, the order of mounting the linear or rotational subassemblies can be adjusted such that, for example, the linear subassembly could be placed on the rotational subassembly.

The embodiments herein have been disclosed with a certain degree of particularity for the purpose of description but not of limitation. Those skilled in the art will appreciate that numerous modifications and variations can be made to the embodiments without departing from the spirit and scope of the application.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

While the above description provides examples of one or more processes or apparatuses, it will be appreciated that other processes or apparatuses may be within the scope of the disclosure. It will also be understood that the processes and apparatuses may be implemented using hardware or software components or an appropriate combination thereof. Software may be provided as instructions on a physical computer medium or the like for execution on a processor of a computing device.

The invention claimed is:

1. A conveyor system comprising:
a track section comprising a control system;
a drive system that is controlled by the control system and that is configured to provide power through a first electromagnetic field and through an alternating second electromagnetic field;
a plurality of moving elements that are driven by the drive system and that are configured to receive power through the first electromagnetic field, wherein at least one of the plurality of moving elements comprises a pick-up unit configured to receive power through the alternating second electromagnetic field;
a pallet support apparatus; and
a plurality of pallets that are configured to engage with the plurality of moving elements and move on the pallet support apparatus,
wherein the drive system and control system are configured such that the first electromagnetic field is modulated at one frequency to provide power to the moving elements, the alternating second electromagnetic field is modulated at another frequency to provide power to the pick-up unit, or both.

2. The conveyor system according to claim 1 wherein the modulation of the frequency of the first electromagnetic field, the alternating second electromagnetic field, or both, is varied in response to the position of the pick-up unit.

3. The conveyor system according to claim 1 wherein the conveyor system comprises a plurality of independent coils along the drive system, at least one of the independent coils producing an electromagnetic field modulated at a different frequency from the electromagnetic field produced by another independent coil.

4. The conveyor system according to claim 1 wherein the conveyor system comprises a plurality of independent coils along the drive system and the conveyor system is configured to:
provide power to the pick-up unit through one of the plurality of independent coils at one location along the drive system, and
provide power to the pick-up unit through another of the plurality of independent coils at a different location along the drive system.

5. The conveyor system according to claim 4 wherein at least one of the independent coils produces an electromagnetic field modulated at a different frequency from the electromagnetic field produced by another independent coil.

6. The conveyor system according to claim 1 wherein the drive system comprises a linear motor and a portion of the linear motor is adapted to provide power to the pick-up through the alternating second electromagnetic field.

7. The conveyor system according to claim 1 wherein the conveyor system is adapted to control the power delivered to the pick-up by controlling the presence, absence, or strength of the alternating second electromagnetic field.

8. The conveyor system according to claim 1 wherein the pick-up unit provides power to an engaged pallet, and the provided power is used to power at least one motor positioned on the pallet.

9. The conveyor system according to claim 8 wherein the at least one motor positions a work plate on the pallet.

10. The conveyor system according to claim 9 wherein the motor positions the work plate by: shifting the work plate perpendicular to a pallet travel path, rotating the work plate, or both.

11. A method of providing power to a moving element of a conveyor system and to a pick-up unit of the moving element, the method comprising:
providing a first electromagnetic field to provide power to the moving element;
providing an alternating second electromagnetic field to provide power to the pick-up unit; and
modulating the first electromagnetic field at one frequency to provide power to the moving element, modulating the alternating second electromagnetic field at another frequency to provide power to the pick-up unit, or both.

12. The method according to claim 11 wherein the modulation of the frequency of the first electromagnetic field, the alternating second electromagnetic field, or both, is varied in response to the position of the pick-up unit.

13. The method according to claim 11, comprising producing an electromagnetic field modulated at one frequency using one independent coil and producing another electromagnetic field modulated at an another frequency using another independent coil, wherein the two electromagnetic fields are modulated at different frequencies.

14. The method according to claim 13 wherein power is provided to the pick-up unit through the one independent coil at one location and power is provided to the pick-up unit through the other independent coil at another location.

15. The method according to claim 11 wherein delivery of power to the pick-up is controlled by changing the presence, absence, or strength of the alternating second electromagnetic field.

16. The method according to claim 11 further comprising providing power from the pick-up unit to at least one motor positioned on a pallet engaged by the moving element, and powering the at least one motor.

17. The method according to claim 16 wherein powering the at least one motor comprises using the motor to position a work plate by shifting the work plate perpendicular to a pallet travel path, rotating the work plate, or both.

* * * * *